(12) United States Patent
Bryan et al.

(10) Patent No.: US 6,664,980 B2
(45) Date of Patent: *Dec. 16, 2003

(54) VISUAL NAVIGATION UTILIZING WEB TECHNOLOGY

(75) Inventors: Douglas L. Bryan, Buffalo Grove, IL (US); Anatole V. Gershman, Chicago, IL (US)

(73) Assignee: Accenture LLP, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,158

(22) Filed: Feb. 26, 1999

(65) Prior Publication Data

US 2003/0048307 A1 Mar. 13, 2003

(51) Int. Cl.[7] .................................................. G09G 5/00
(52) U.S. Cl. ....................... 345/738; 345/819; 345/820; 345/825; 705/26
(58) Field of Search ................. 707/2–5, 101–104; 345/737, 738, 739, 853, 817, 825, 818, 819, 820; 705/26, 27

(56) References Cited

U.S. PATENT DOCUMENTS

| 5,483,278 A | * | 1/1996 | Strubbe et al. ............... 725/61 |
| 5,877,765 A | | 3/1999 | Dickman et al. ............ 345/835 |
| 5,890,152 A | | 3/1999 | Rapaport et al. |
| 6,003,034 A | * | 12/1999 | Tuli ........................... 707/101 |
| 6,014,638 A | * | 1/2000 | Burge et al. ................... 705/27 |
| 6,018,724 A | * | 1/2000 | Arent .......................... 705/44 |
| 6,043,652 A | * | 3/2000 | Liu ............................. 324/309 |
| 6,076,091 A | * | 6/2000 | Fohn et al. .................. 707/102 |
| 6,094,652 A | * | 7/2000 | Faisal ............................. 707/5 |
| 6,101,537 A | * | 8/2000 | Edelstein et al. ............ 709/219 |
| 6,243,713 B1 | * | 6/2001 | Nelson et al. ............... 707/104 |
| 6,317,722 B1 | * | 11/2001 | Jacobi et al. .................. 705/14 |
| 6,329,986 B1 | * | 12/2001 | Cheng .......................... 345/419 |
| 6,366,956 B1 | * | 4/2002 | Krishnan ..................... 709/223 |

FOREIGN PATENT DOCUMENTS

| EP | 0798655 A2 | 10/1997 |
| EP | 0903889 A2 | 3/1999 |
| WO | WO 9810597 | 3/1998 |

OTHER PUBLICATIONS

Rao, R. et al.: "Rich Interaction in the Digital Library" Communications of the Association for computing Machinery, Association for computing Machinery. New York, US, vol. 38, No. 4, Apr. 1, 1995, pp. 29–39, XP000517439, ISSN: 0001-0782, p. 31, left–hand column, line 9–right–hand column, line 17; figure 2.

(List continued on next page.)

Primary Examiner—Ba Huynh
(74) Attorney, Agent, or Firm—Oppenheimer Wolff & DonnellyyLLP

(57) ABSTRACT

A display navigation system is presented in which indicia for a first target category and a second target category are presented to a user on a display, where the indicia are associated with keywords and the keywords are assigned weight. The user then performs various interactions and the user's interactions are detected. Additional indicia are presented to the user in response to the interactions, where the additional indicia represent additional target categories that are similar or dissimilar to the first and second target catergories depending on the interactions and weight of the keywords. Finally, additional indicia are displayed.

34 Claims, 24 Drawing Sheets

OTHER PUBLICATIONS

Kay, A.: "Computer Software" Scientific American, Scientific American Inc. New York, US, vol. 251, No. 3, Sep. 1, 1984, pp. 41–47, XP000715884, ISSN: 0036–8733, p. 47; figure.

"Simplification of a Database Qurey Through the Use of a Category Window" IBM Technical Disclosure Bulletin, IBM vol, 33, No. 3B, Aug. 1, 1990, pp. 459–461, XP000124421, ISSN: 0018–8689, the whole document.

Benest, I.D. et al.: "A Humanised Interface to an Electronic Library", Interact Conference Proceedings, XX, XX, 905–910, XP000746896, p. 908, left–hand colum, line 33 – p. 909, left–hand column, line 15; figure 3.

Database Inspec 'Online!', The Institution of Electrical Engineers, Stevenage, GB; Inspec No. AN 2047376, XP002181949, abstract, & Diillon et al.: "FASIT: a fully automatic syntactically based indexing system" Journal of the American Society for INformation Science, vol. 34, No. 2, Mar. 1983, pp. 99–108, USA.

Sumner, R.G. Jr. et al.: "An Investigation of Relevance Feedback Using Adaptive Linear and Probabilistic Models" Nist Special Publication, Gaithersburg, MD, US, Nov. 1, 1996, pp. 555–570, XP002090102, ISSN: 1048–776X, abstract.

* cited by examiner $$sim(A,B) = \frac{\sum_{i=1}^{n}(A_i * B_i)}{\sqrt{\sum_{i=1}^{n}(A_i^2) * \sum_{i=1}^{n}(B_i^2)}}$$

Figure 4

$$\frac{|XUY|}{|XUY|}$$

Figure 5

$$match(q) = \sum_{w \in q} weight(w)$$

Figure 9

$$wordR = \sum_{w \in \bigcup_{m \in repSet} m} NDF(w)$$

Figure 15

$$common(i) = \bigcup_{j=i-dn}^{i} m(j)$$

Figure 19

$$direction(i) = \frac{|common(i)|}{|m(i)|}$$

Figure 20

$$ispeed(i) = \frac{\sum_{j=i-dn+1}^{i} \frac{|m(j) \cap m(j-1)|}{|m(j) \cup m(j-1)|}}{dn}$$

$$= \frac{\sum_{j=i-dn+1}^{i} \frac{|m(j) \cap m(j-1)|}{|m(j)| + |m(j-1)| - |m(j) \cap m(j-1)|}}{dn}$$

Figure 21

$$depth(i) = \alpha * direction(i) + \beta * ispeed(i) + \chi * descent(i)$$

$$\text{where } \alpha + \beta + \chi = 1$$

$$NIDF(w) = 1 - NDF$$

$$descent(i) = \frac{\sum_{w \in common(i)} NIDF(w)}{|common(i)|}$$

Figure 22

VISUAL NAVIGATION UTILIZING WEB TECHNOLOGY

FIELD OF THE INVENTION

The present invention relates to agent based systems and more particularly to a system which automatically obtains information based on visual indicia selection and navigation.

BACKGROUND OF THE INVENTION

Graphical representation of information for a user is becoming much more commonplace as more graphic displays with higher resolution and larger viewing areas are becoming more commonplace than sharpened pencils in modern offices. Early examples of these systems include the Computer Aided Design/Computer Aided Manufacturing (CAD/CAM) stations popularized by Lockheed for designing airplanes. These stations utilized fixed, predefined libraries of symbols to create visual depictions of commonplace items found in engineering drawings. Later, companies such as IBM began applying this technology to database applications to graphically depict relational databases and allow a user to interact in an intuitive fashion with these databases. During this same era, Xerox Parc popularized iconology systems with the advent of the Xerox Star computer system and ushered in a mouse driven approach to graphical computing that was commercialized successfully by Apple with the MacIntosh computer system.

Today, a user is bombarded with icons and windows and other information that requires skilled interaction with sophisticated applications to identify and process information on a personal computer. A requirement for an intuitive interface to massive amounts of information has existed for many years, and is still absent in the marketplace.

SUMMARY OF THE INVENTION

According to a broad aspect of a preferred embodiment of the invention, a system exposes users to lots of interesting items using very simple operations. Given that computers cannot yet read minds and that people are poor at precisely articulating interests, the problem becomes one of approximating interests. Users are gradually and deliberately moved through a product space, giving them time to select their interest. For example, if a user clicks on a picture of a baseball, the system does not immediately assume that they are interested in baseballs. The user's interest might be sporting goods, ball sports, baseball equipment, or softball equipment that is their actual interest. By gradually moving users through a product space, time is allotted to the user to differentiate these interests.

The system allows users to navigate through a collection of visual items (e.g., consumer products, homes, wallpaper patterns) using a few simple operations such as "more of this" and "less of that." To build a display system in accordance with a preferred embodiment one must (1) construct a collection of items (a database), and (2) implement the operations. The operations are user interactions, and thus must be fast enough to feel interactive. Generally speaking, the execution of an operation should not take more than a couple of seconds.

The system begins by displaying diverse items, where "diverse" is relative to both the database and the user. The database itself constrains diversity (we cannot display items not in the database). Further, if we know something of the user's interests, we can further constrain diversity (e.g., if the user hates silk shirts, don't show silk shirts). For example, a diverse set of items from a haberdashery database might include shoes, shirts, suites, ties and jackets. The two basic operations are more(x) and less(x) where x is a specific item. More(x) results in the display of a new collection of items that, collectively, are more similar to x than the items previously displayed. Less(x) results in a new display containing items that collectively are less like x. Thus the crux of the matter, at run-time, is the similarity of items.

DESCRIPTION OF THE DRAWINGS

The foregoing and other objects, aspects and advantages are better understood from the following detailed description of a preferred embodiment of the invention with reference to the drawings, in which:

FIG. 4 depicts the similarity between two documents A and B in accordance with a preferred embodiment;

FIG. 5 is an equation for calculating the similarity between two sets X & Y in accordance with a preferred embodiment;

FIG. 9 illustrates the mathematics that are utilized by the mixer to determine the optimal mixing of the various characteristics in accordance with a preferred embodiment;

FIG. 15 presents the mathematical representation of the equation in accordance with a preferred embodiment;

FIGS. 19 and 20 illustrate the mathematical formula associated with the calculations of distance and direction in accordance with a preferred embodiment;

FIG. 21 illustrates the formula for the calculation of speed in accordance with a preferred embodiment;

FIG. 22 illustrates the mathematical formula associated with the calculation of NIDF and depth in accordance with a preferred embodiment;

DETAILED DESCRIPTION

Figure 1:
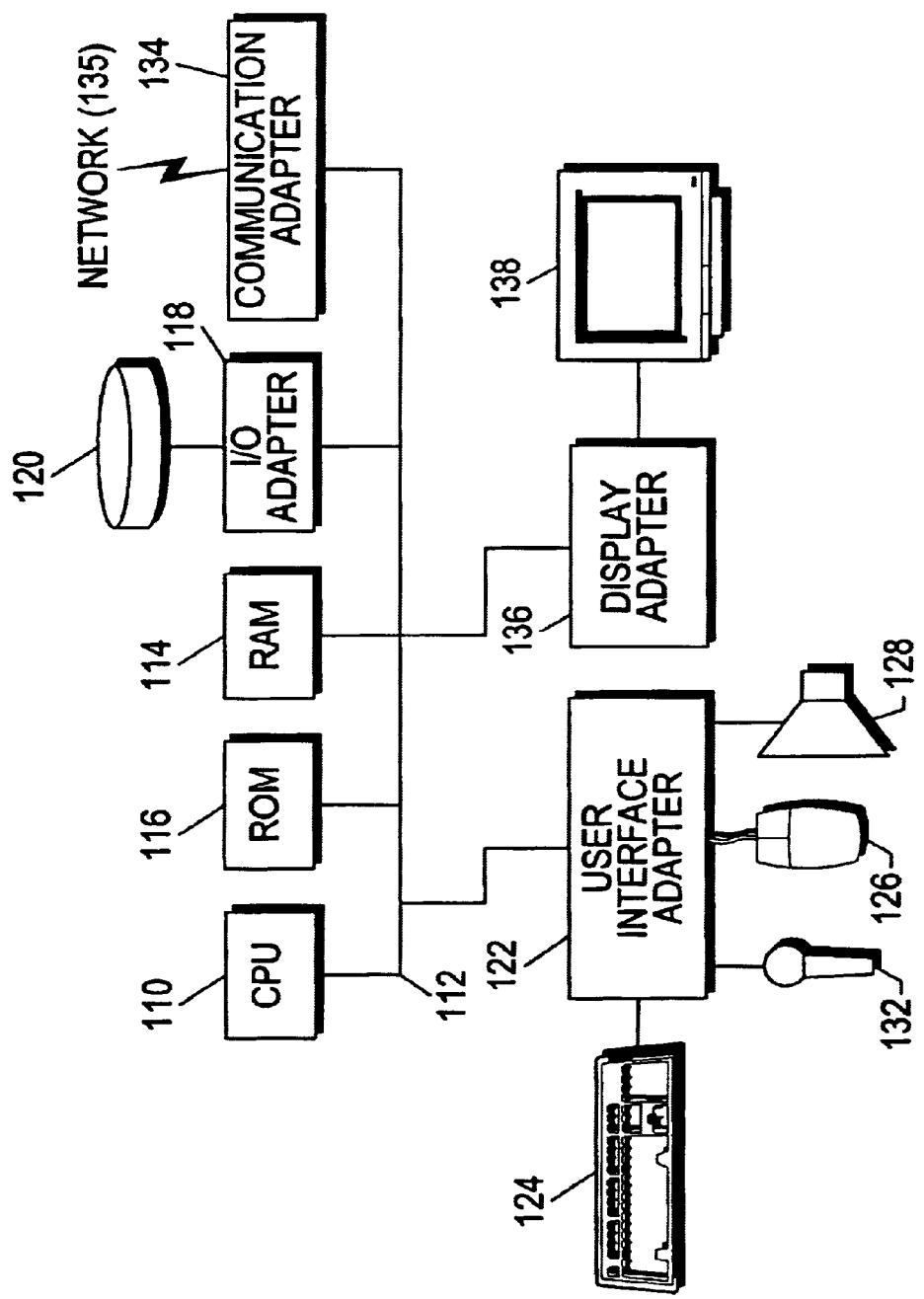
FIG. 1 is a block diagram of a representative hardware environment in accordance with a preferred embodiment.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-suifficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after being called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HITP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike BTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

In accordance with a preferred embodiment,

Introduction

Recently, a high-fidelity prototype of the aquarium was implemented using a user interface metaphor. The aquarium is a user interface in which each of the items of interest are implemented as individual elements having unique characteristics, much like fish in an aquarium. The main goals of the implementation were:

1. Perform well on standard Wintel machines using low-cost graphics adapters.
2. Demonstrate that the aquarium metaphor, with its minimalist operations, is sufficient for navigating a collection of 10,000 products. The collection is navigable if users enjoy themselves, don't get lots too often, and can find what they want. The prototype was built in C++ using DirectDraw, and executes on a dual-processor, Pentium II, Windows NT workstation with a Ellsa Gloria Synergy graphics adapter. DirectDraw and the Gloria adapter were capable of simultaneously animating 12 product photographs at 30 frames per second on a 1600×1000 pixel display. In accordance with a preferred embodiment, one of ordinary skill in the art is presented with an implementation in four sections: problem statement, design, specification and implementation to allow one of ordinary skill in the art to make and use the invention without undue experimentation. The problem statement characterizes the aquarium at a very abstract level. It states what the aquarium does, not why or how. The design section outlines the major components of our implementation. The specification sections describes key algorithms at an abstract level, and the implementation section presents the algorithms used.

Problem Statement

The aquarium exposes users to lots of interesting items using very simple operations. Given that computers cannot yet read minds and that people are poor at precisely articulating interests, the problem becomes one of approximating interests. The system can never completely understand interests, so we must move users gradually and deliberately through a product space, giving them time to pick their interest. For example, if a user clicks on a picture of a baseball, we cannot immediately assume that they are interested in baseballs. It might be sporting goods, ball sports, baseball equipment, or softball equipment that is their actual interest. By gradually moving users through a product space, we given them time to differentiate these interests.

The approach taken by the aquarium metaphor is to allow users to move freely about a collection of items so that even if we cannot determine their interests, users can get to where they want to go. The aquarium allows users to navigate through a collection of visual items (e.g., consumer products, homes, wallpaper patterns) using a few simple operations such as "more of this" and "less of that." To build an aquarium one must (1) construct a collection of items (a database), and (2) implement the operations. The operations are user interactions, and thus must be fast enough to feel interactive. Generally speaking, the execution of an operation should not take more than a couple of seconds.

The aquarium begins by displaying diverse items, where "diverse" is relative to both the database and the user. The database itself constrains diversity (we cannot display items not in the database). Further, if we know something of the user's interests, we can further constrain diversity (e.g., if the user hates silk shirts, don't show silk shirts). For example, a diverse set of items from a haberdashery database might include shoes, shirts, suites, ties and jackets. The two basic operations are more(x) and less(x) where x is a specific item. More(x) results in the display of a new collection of items that, collectively, are more similar to x than the items previously displayed. Less(x) results in a new display containing items that collectively are less like x. Thus the crux of the matter, at run-time, is the similarity of items.

Design

The two major parts of an aquarium are the construction of the database and the run-time operation of the aquarium. The run-time operation is divided into two parts: the animator and the mixer. The animator moves items about the display, while the mixer determines which items are to be displayed. The mixer implements user operations, based on item similarity. The mixer is the main client of the database, and thus the function of the mixer affects the design of the database. That is, the database is designed to efficiently support the mixer.

Our approach to constructing the database is based on a few simple concepts which were developed by the information retrieval community (IR) over the past 30 years. The key concept is that an item can be accurately characterized by the words used to describe it. For example, a shirt might be characterized by "apparel, shirt, blue, oxford, dress, long sleeve, men's" and a pair of pants by "apparel, pants, wool, gray, dress, cuffed, men's." The semantics of the words isn't needed. Rather, the existence of words (Is it blue? Is it a shirt?) is sufficient. Given a small set of words characterizing each item, similarity between items is then based on the words they have in common. For example, the aforementioned shirt and pants are similar simply because they share the words "apparel, dress, men's."

A prototype consumer product database was constructed by gathering 12,000 products from the Web sites of Wal-Mart, Sam's Club, Land's End, and Sharper Image. Product photographs and product Web pages were collected from the web. The pages generally include the name of the product, where it is placed within the retailer's product hierarchy (e.g., apparel/haberdashery/men's/pants), and a short text description of the product. Pages are converted to plain text and run through IR tools to extract a small set of keywords per product. In the 12,000 product database, product keyword set sizes averaged 9 words with a standard deviation of 2.5. A little over 3,000 unique keywords were used to describe the 12,000 products.

Figure 2:
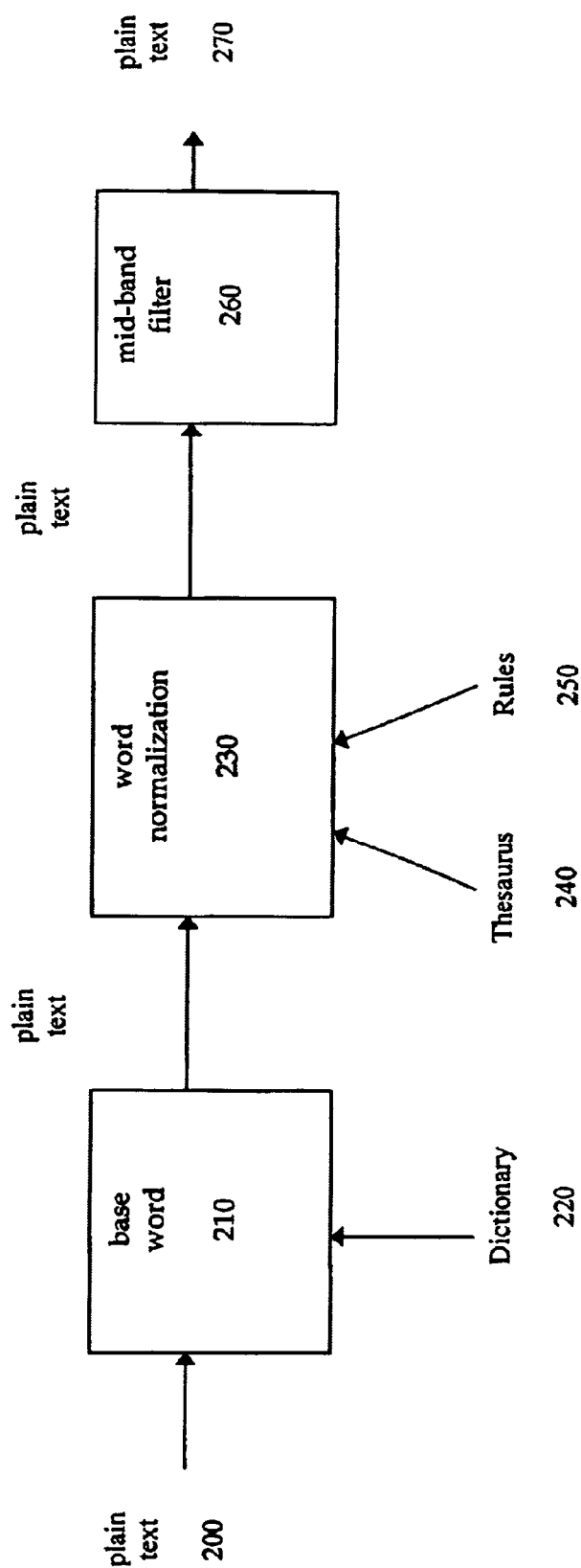
FIG. 2 illustrates the processing of the plain text of pages in accordance with a preferred embodiment.

FIG. 2 illustrates the processing of the plain text of pages in accordance with a preferred embodiment. The plain text 200 of a product page is input to a base word 210 component which reduces each word to its base. For example, "ran" becomes "run" and "swimming" becomes "swim." Traditionally this has been referred to as word stemming and morpheme analysis. In the past this was performed using ad hoc heuristics such as, if a word ends in "ing" then remove the "ing." Today it is more practical to perform these operations using a full dictionary or lexical reference system 220. The base word component may also remove non-words, such as "II" in "Quake II," and to eliminate words with little semantics such as definite and indefinite articles ("a", "the").

Next the words are normalized 220. Here we use a thesaurus 240 to combine synonyms, separate homonym, and augment descriptions following pre-defined rules 250. For example, if one product description contains the word "bike" and another "bicycle," then we use a set of rules 250 to determine which word to replace with the other. It does not particularly matter which word we use, but it is important that consistency is maintained.

Separating homonyms is more difficult and requires additional context. An example homonym is "boot." In an outerwear catalog this word has one meaning, while in a computer catalog it has an entirely different meaning. This ambiguity must be removed. The rule set is used to determine how. For example, we could simply remove the word "boot" from a description unless the description also contains "footwear", "outerwear" or "apparel." The result would be that in a database in accordance with a preferred embodiment, "boot" would only have one meaning, the meaning associated with outerwear.

The thesaurus is also used to augment descriptions and deal with domain-specific words. An example of augmentation is that if a, description contains "sweater," then we want to ensure that the description also contains "shirt" since a sweater is a kind of shirt. If the description does not contain "shirt" then we simply add it. Domain-specific words are those not typically found in a general purpose thesaurus. Two examples from the retail clothing domain are that a "skort" is both a skirt and a pair of shorts, and a "sneaker" is a kind of shoe. The main purpose of using base words and word normalization is to create a consistent corpus. Ideally, within the corpus (i.e., across all descriptions used to create a database), a word has one and only one meaning and all items that could logically be described by a given word are described by that word. An example of this last requirement is that if most users would consider a given item to be a kind of shirt, then the item's description contains the word "shirt."

Figure 3:
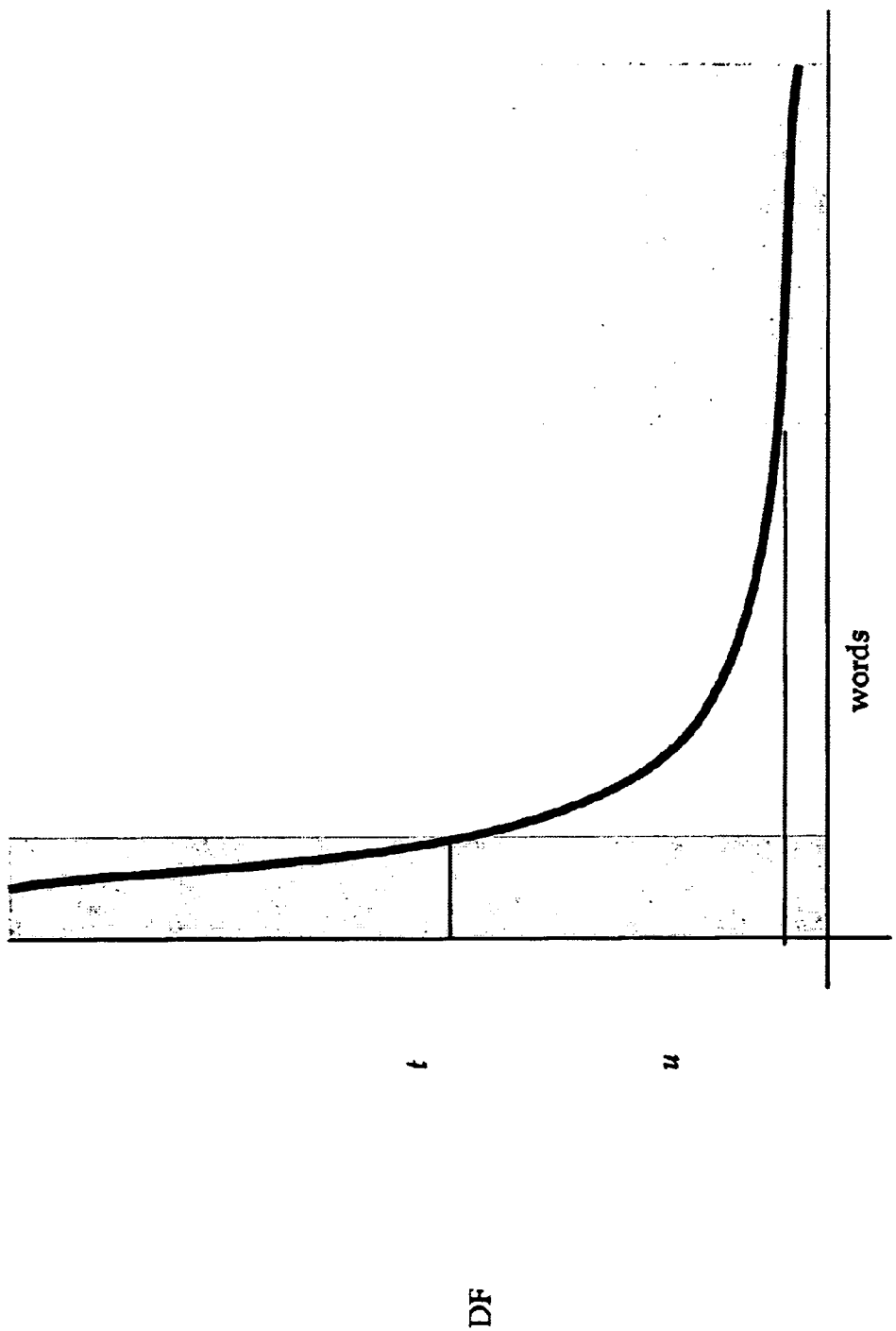
FIG. 3 is a graph showing the document frequency for thresholds in accordance with a preferred embodiment.

The next step is to apply a mid band filter 260 to filter out words that are of little use in categorizing products. Remember, the main purpose of a database in accordance with a preferred embodiment is to assist in identifying "similar"products. Words that appear in many descriptions (e.g., "a" and "the") create too many similarities to be of use. Words that appear in too few descriptions (e.g., "synthesized") are also of little use. IR research has shown that the discriminating keywords are the ones in the middle. FIG. 3 is a graph showing the document frequency for thresholds in accordance with a preferred embodiment. The "Document Frequency" (DF) of a word is simply the number of descriptions it appears in. Let DF(w) denote the document frequency of a word w. Then, words that do not satisfy $t<DF(w)<u$ are eliminated for some thresholds t and u. This is illustrated by the graph presented in FIG. 3. All the words of the corpus are sorted by their DF and plotted horizontally. We wish to limit or eliminate any words that appear on the far left of the graph, and those words appearing on the far right of the graph.

After this process, descriptions are simply lists of words. The next step is to reduce the lists to a more concise representation that can be used to build the database. Traditionally the IR community has used a vector-space model for this purpose. In this model, the words of a corpus are ordered and assigned ordinal numbers. The term frequency of a word ordinal w in a document d is simply the number of times the corresponding word appears in d. We write this as TF(w, d). A document is then described by a vector of its term frequencies. For example, suppose our corpus contains only two documents: "men shirt" and "women shirt." Ordinal numbers are assigned: men=0, shirt=1, women=2, and the first document is described by the vector (1, 1, 0) while the second is described by (0, 1, 1).

Using the vector model, there are many possible ways to calculate the similarity of two documents. One method is simply to measure the angle between two vectors. The smaller the angle, the more similar two documents appear. FIG. 4 depicts the similarity between two documents A and B in accordance with a preferred embodiment. In consumer product descriptions it has been determined that the use of term frequencies tended to cause similarity to be based largely on the retailer that supplied the description, rather than the nature of the product being described. This is not surprising for two reasons. First, product descriptions tend to be very short, and thus term frequencies do not "average out" as they do in larger documents. Second, writing styles vary between vendors. The way that Sharper Image describes a clock is much different than the way Wal-Mart does. As a result, we decided not to use term frequencies. Instead, our database is based on a set model.

Figure 5:
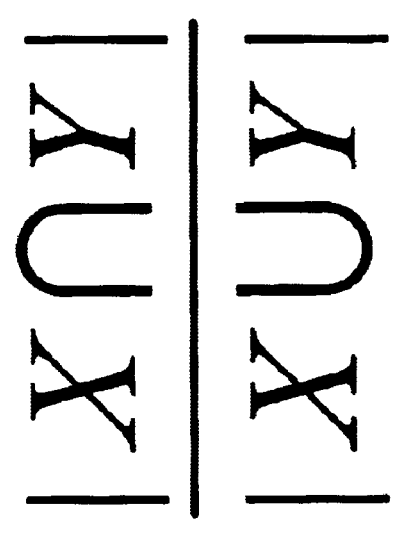

In a set model of documents, words are again given ordinals and documents are characterized by the set of ordinals of the words used in their descriptions. For example, the sets for the two example documents discussed above are {0, 1} and {1, 2}. FIG. 5 is an equation for calculating the similarity between two sets X & Y. Similarity is then a measure of the intersection of two sets; e.g., the cardinality of their intersection divided by the cardinality of their union. A database is built off-line, and contains word sets and similarity information for all products in the corpus. The run-time portion of the aquarium contains two major subsystems: the animator and the mixer.

Figure 6:
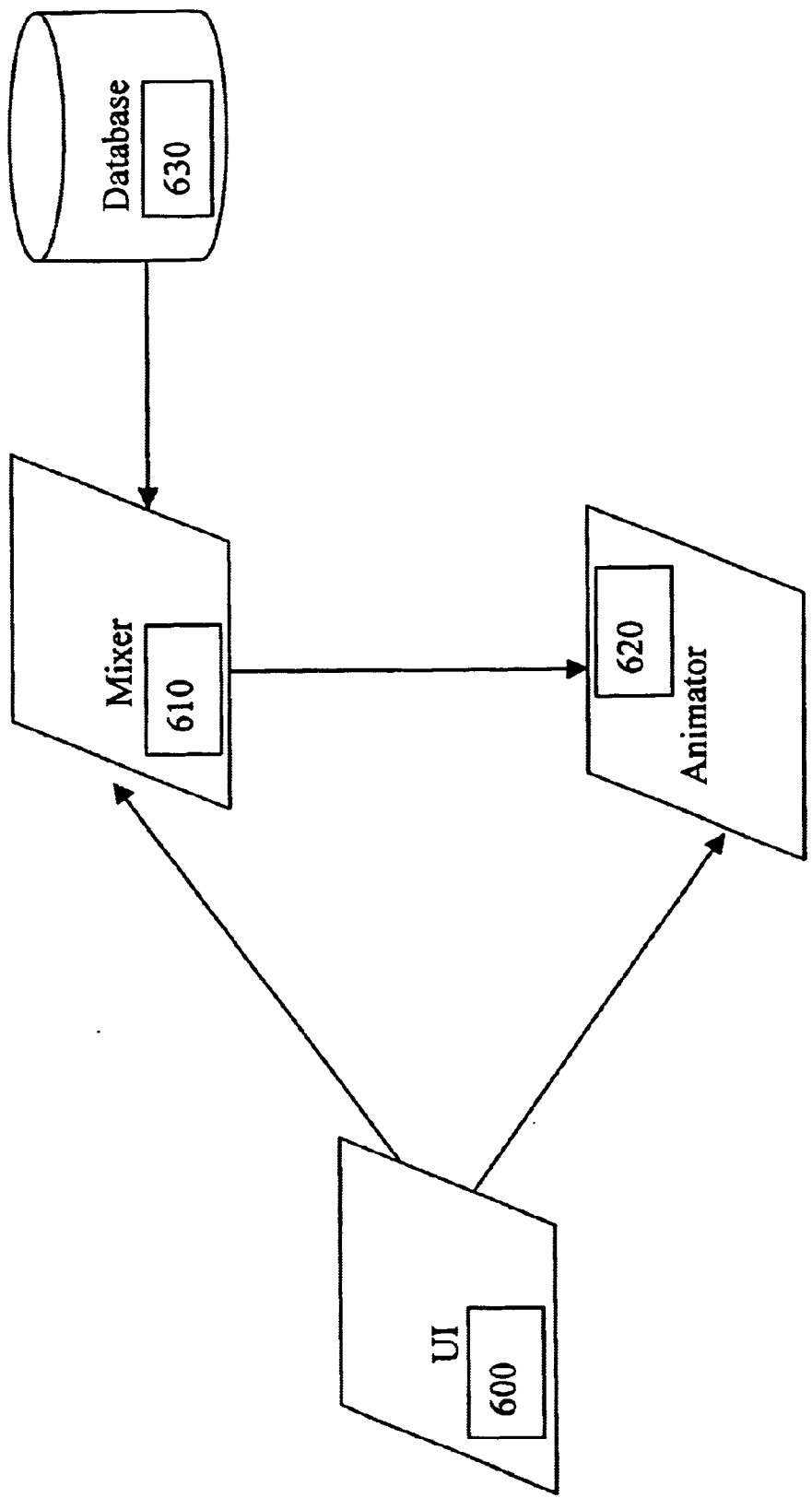
FIG. 6 is a flow diagram of an aquarium system in accordance with a preferred embodiment.

The aquarium is a soft real-time system in that it must (1) react to user commands, and (2) animate product photographs at a speed of about 30 frames per second. We have divided the aquarium's run-time system into three threads: user input, mixer and animator. FIG. 6 is a flow diagram of an aquarium system in accordance with a preferred embodiment. The User Input (UI) 600 feeds information into the Mixer 610 and the Animator 620. The Mixer 610 also utilizes information from a database 630 for responding to the UI 600 to animate the items on the display effectively by the Animator 620. The arrows in FIG. 6 represent the direction of data-flow in the system. The UI thread 600 corresponds to the operating system event loop. The thread 600 in accordance with a preferred embodiment interprets user inputs such as keystrokes and mouse clicks, and sends commands to the mixer 610 and animator 620 threads with corresponding information from the database 630. The animator 620 task's primary responsibility is to manage image manipulation on the display. The mixer 610 is responsible for determining what items are to be on display. It executes user commands like "more(x)" by querying the database 630 to identify the next few items for display. The mixer 610 sends "add item x" and "remove item y" commands to the animator 620.

Figure 7:
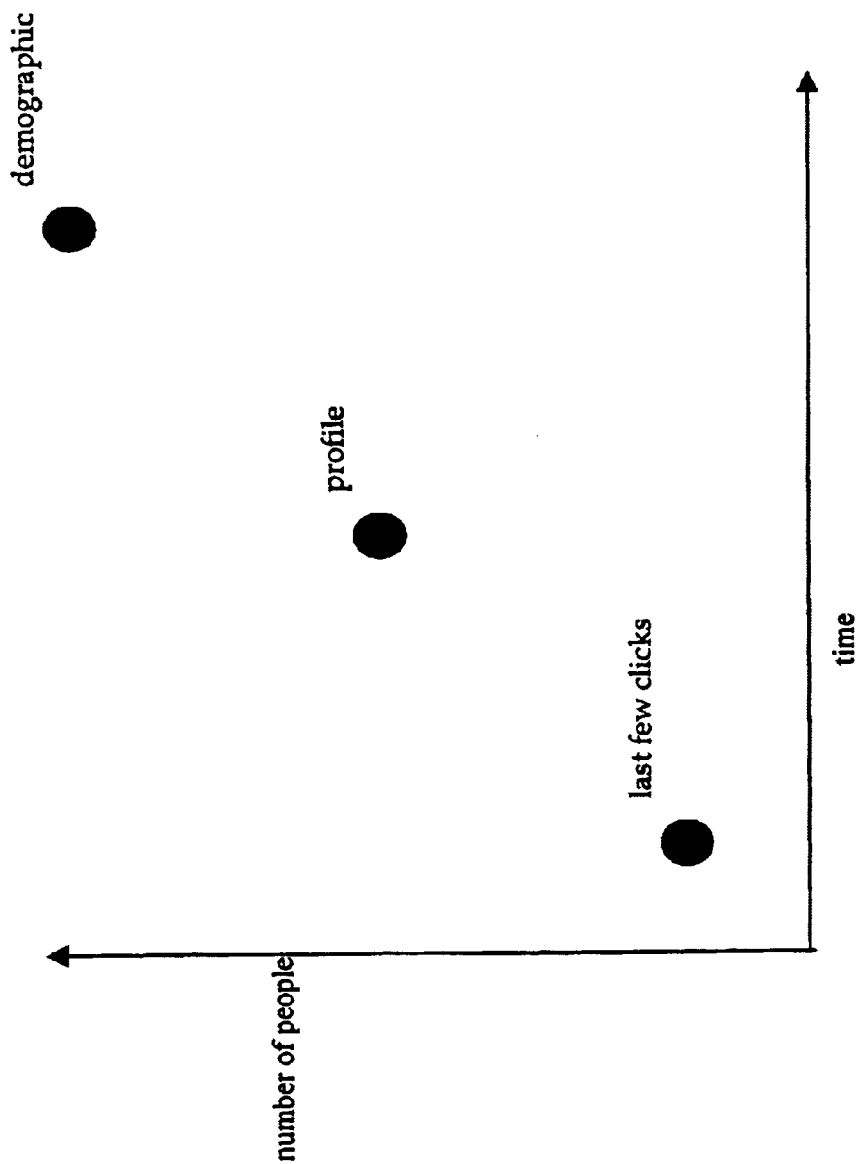
FIG. 7 is a plot illustrating the correspondence between users and their actions plotted over time in accordance with a preferred embodiment.

The mixer, in effect, determines what products are of interest to the user. User interests may be categorized by two properties: the duration of an interest and the number of other users that share the interest. FIG. 7 is a plot illustrating the correspondence between users and their actions plotted over time in accordance with a preferred embodiment. A user's last few inputs (mouse clicks) represent near-term interests specific to that user. These interests tend to last a few minutes. User profiles may be used to capture interests across sessions. Such interests tend to last a few months to a few years. For example, an interest in summer clothing or gardening may be captured in a profile. Finally, the profile will also contain basic statistics about a user, such as age, sex, marital status and income, can be used to place the user in a broad population category and identify interests common to that category. Examples of such demographic interests are that upper income, male executives tend to be interested in golf, and young females with infants tend to be interested in disposable diapers.

These three classes of interests work together in the interaction of the mixer with a particular user. Given a more(p) operation, the degree to which product q is of interest is a function:

The keyword similarity of p and q. We call this corpus similarity since it is based simply on the keywords of the corpus.

The degree to which q matches a user's profile.

The degree to which q matches a user's demographic categories.

Figure 8:
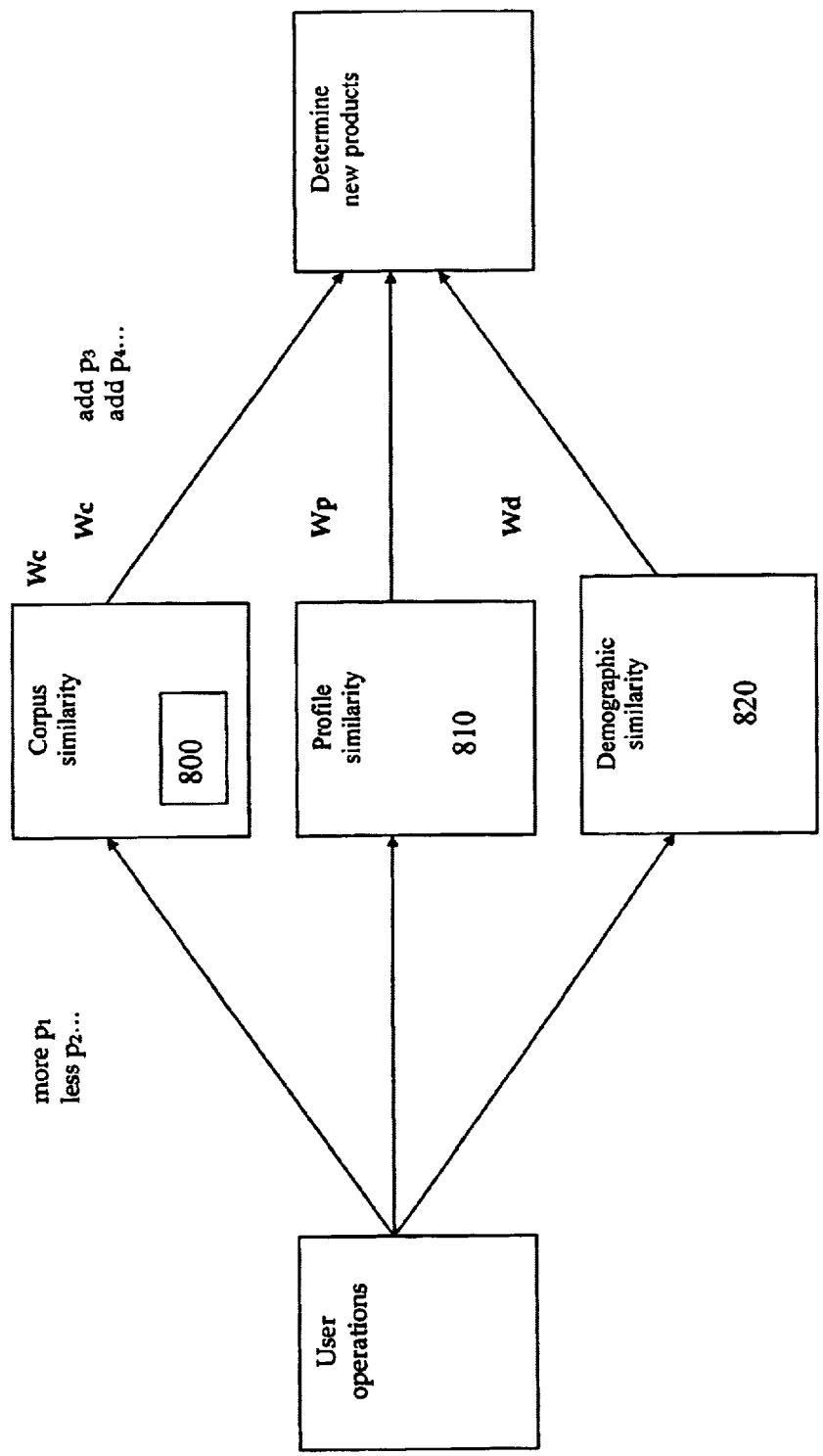
FIG. 8 illustrates how different factors are integrated into affinity engines in accordance with a preferred embodiment.

FIG. 8 illustrates how different factors are integrated into affinity engines in accordance with a preferred embodiment. Each engine 800, 810 and 820 competes for screen space by suggestions what products to add to the display. The engines' suggestions are weighted (Wc, Wp and Wd) to factor in the mix of products displayed. One of ordinary skill in the computer arts will readily comprehend that profile or demographic similarity could be incorporated without undue experimentation and or detracting from the claimed invention.

Detailed Specification

Database

The mixer must perform user operations in a second or two, and thus it makes sense to optimize the database for the operations needed by the mixer. Basically, the interface to the database must be whatever operations are needed by the mixer. For the current implementation of the mixer, these operations include:

1. Keywords:
    Number of keywords in the corpus.
    Mappings from keyword ordinals to text, and vice versa.
    The normalized document frequency (NDF) of each keyword.
2. Products:
    Keyword sets for each product.
    Photographs for each product.
    Price of each product.
3. Product similarity. Given a product p, return the set of products which have a non-zero corpus similarity to p. (i.e., all products that share a keyword with p.)
4. Representative set of products for the entire corpus.

The document frequency of a keyword w is the number of product descriptions that w appears in. The normalized document frequency (NDF) of w is its document frequency divided by the maximum document frequency in the corpus. Thus, there will always be at least one keyword with a NDF of one.

A representative set, called a rep set, is the set of products displayed when the aquarium starts up. The set contains about twenty products which are representative of the entire twelve thousand product corpus.

Mixer

Figure 9:
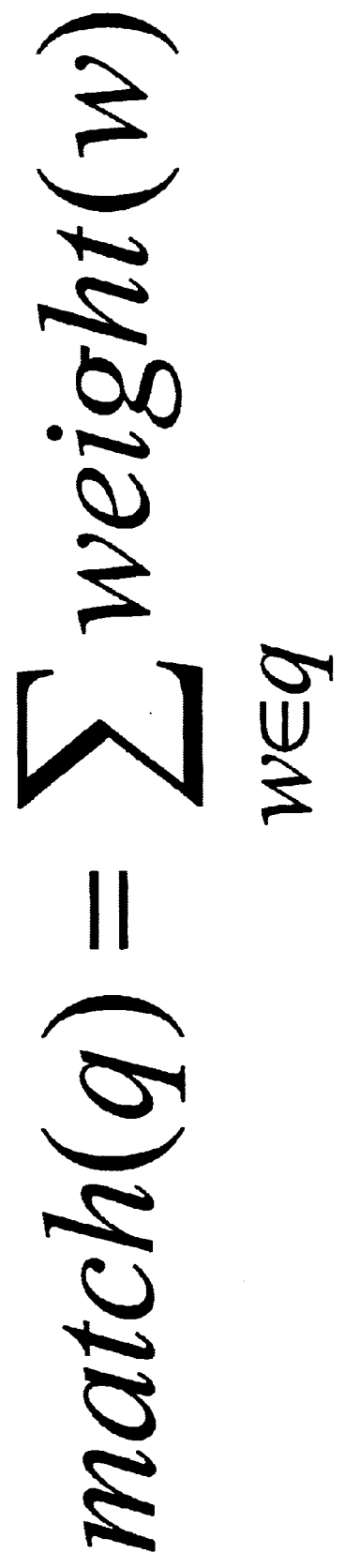

The main two operations performed by the mixer are more(p) and less(p) for a user selected product p. We are evaluating a number of algorithms for these operations. The current algorithm is based on keyword weights. FIG. 9 illustrates the mathematics that are utilized by the mixer to determine the optimal mixing of the various characteristics in accordance with a preferred embodiment. The mixer automatically adjusts the weights of keywords at run-time. Then, the "match" of a product is the sum of the weights of its words. In general, a user's interest in a product q is proportional to match(q). The trick then is in how keyword weights are adjusted at run-time. This is discussed in the implementation section.

Other operations implemented by the mixer are:

Keywords: setWeight(w)

Products: more(p), less(p)

Control: mix, deeper, shallower, home, forward, back

The "mix" operation changes the display to show other products. It is automatically invoked if no user operation is performed during a certain period of time. "Deeper" shows products more similar to the last one selected. "Shallower" shows products less similar but related to the last one selected. For example, if the last item selected is a baseball bat, then "deeper" will show more baseball bats and "shallower" will show more baseball products. "Home", "forward" and "back" have effects similar to their Web browser counterparts.

Animator

The animator maintains the set of products currently on display. It accepts add and remove commands from the mixer. It also accepts a few housekeeping commands from the UI. The animators main function is to animate product photographs. Its commands are:

Products: add(p), remove(p), remove all

Housekeeping: clear background, new motion metaphor

The animator current implements four types of "motion schemes" for product photographs. These are random motion (like fish in an aquarium), horizontal scrolling, vertical scrolling, and no motion. Users may select the scheme to use.

Implementation

The implementations of the database, UI thread and animator are rather straight forward. The design of the database in accordance with a preferred embodiment was focused on performance based on a desktop computer utilizing the Windows operating system and the database was optimized for speed of execution. One of ordinary skill in the computer arts will recognize that a relational database or other production database could be substituted for the database in accordance with a preferred embodiment without diverging from the claimed invention.

Thesaurus

As discussed earlier, general purpose thesauri may be used to normalize product descriptions. We have found, though, that a small part of the thesaurus must be manually constructed since there will always be some domain-specific words, like skort and sneaker. The thesaurus we built by hand contains four kinds of rules:
1. is-a: This is a binary rule. The left and right operands are keyword sets. If a product description is a superset of the left-hand operand, then the right-hand operand is added to the description. For example:
   tractor cultivator is-a plow
2. has-a: Another binary rule whose execution is the same as that of is-a. The difference between is-a and has-a is the semantic relationship between its operands. For is-a, the left operand is a specialization of the right, where with has-a, it's the opposite. We currently do riot use this semantic distinction, but maintain it in our thesaurus in case we need it at a later date. An example has-a relation is:
   bedroom has-a bed
3. is: This binary rule defines an equivalence. In its execution the words in the left-hand operand are replaced with those on the right; e.g.,
   bike is bicycle
4. is-noise: This unary rule simply directs the given word to be removed from descriptions; e.g.,
   assortment is-noise Corpus Metrics Our navigation algorithms are based on small keyword sets for each product. If these keyword sets are inaccurate, then no algorithm, no matter how sophisticated, will provide good navigation. We have developed a few metrics for evaluating corpora. These are:
1. Similar set cardinalities.
2. Smooth document frequency curves.
3. Smooth distance curves.
4. Usage testing.
5. Clustering. The first is to simply set cardinality. All the sets should be about the same size. Our sets average nine keywords with a standard deviation of 2.5. This deviation is a bit high (relative to the average cardinality and number of products), and should probably be reduced.

Figure 10:
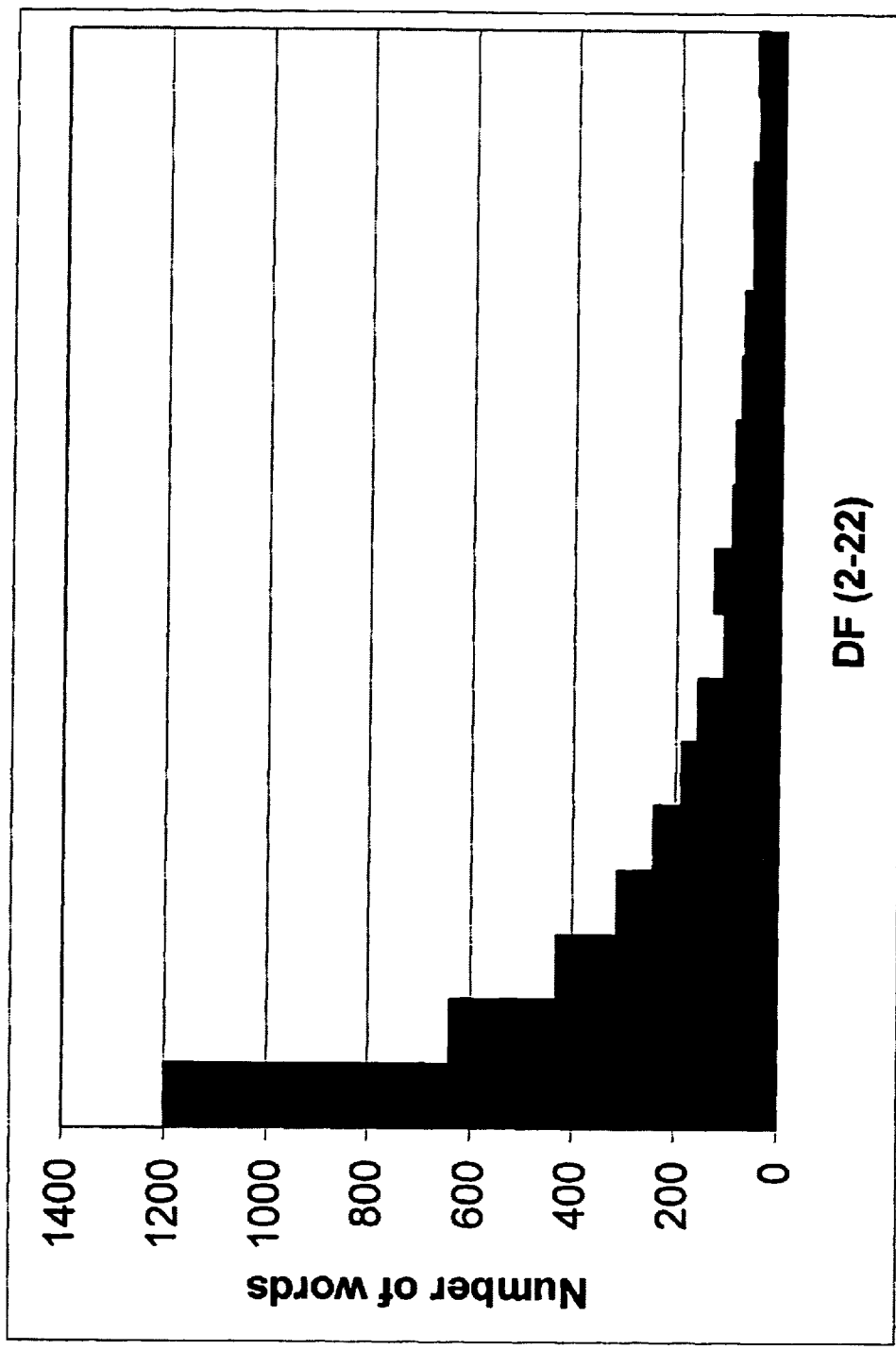
FIG. 10 illustrates a plot of number of words on the vertical axis versus the Document frequency (DF) of keywords on the horizontal axis in accordance with a preferred embodiment.

Another metric is to determine how many products are described by a keyword, and eliminate words which describe too many or too few products. If a word describes only one product, then it is of no use in finding similar products. If a keyword describes too many products (e.g., 80% of the corpus) then it again is of little use. FIG. 10 illustrates a plot of number of words on the vertical axis versus the Document frequency (DF) of keywords on the horizontal axis in accordance with a preferred embodiment. As shown in FIG. 107 the DF of keywords may be plotted in a histogram with DF on the horizontal axis and number of words with that DF on the vertical to shows that our corpus has twelve hundred words with a DF of two, and about fifty words with a DF of twenty-two. The words with a DF of two or three could probably be eliminated without affecting navigation.

Another set of metrics involve the average distance between a product and all other products. Distance between two products may be measured in two ways:
1. Boolean: the number of words in the symmetric difference of two keyword sets. (The symmetric difference of two sets are the members which are in their union but not their intersection.)
2. NDF: the sum of the NDF's of the words in their symmetric difference.

Figure 11:
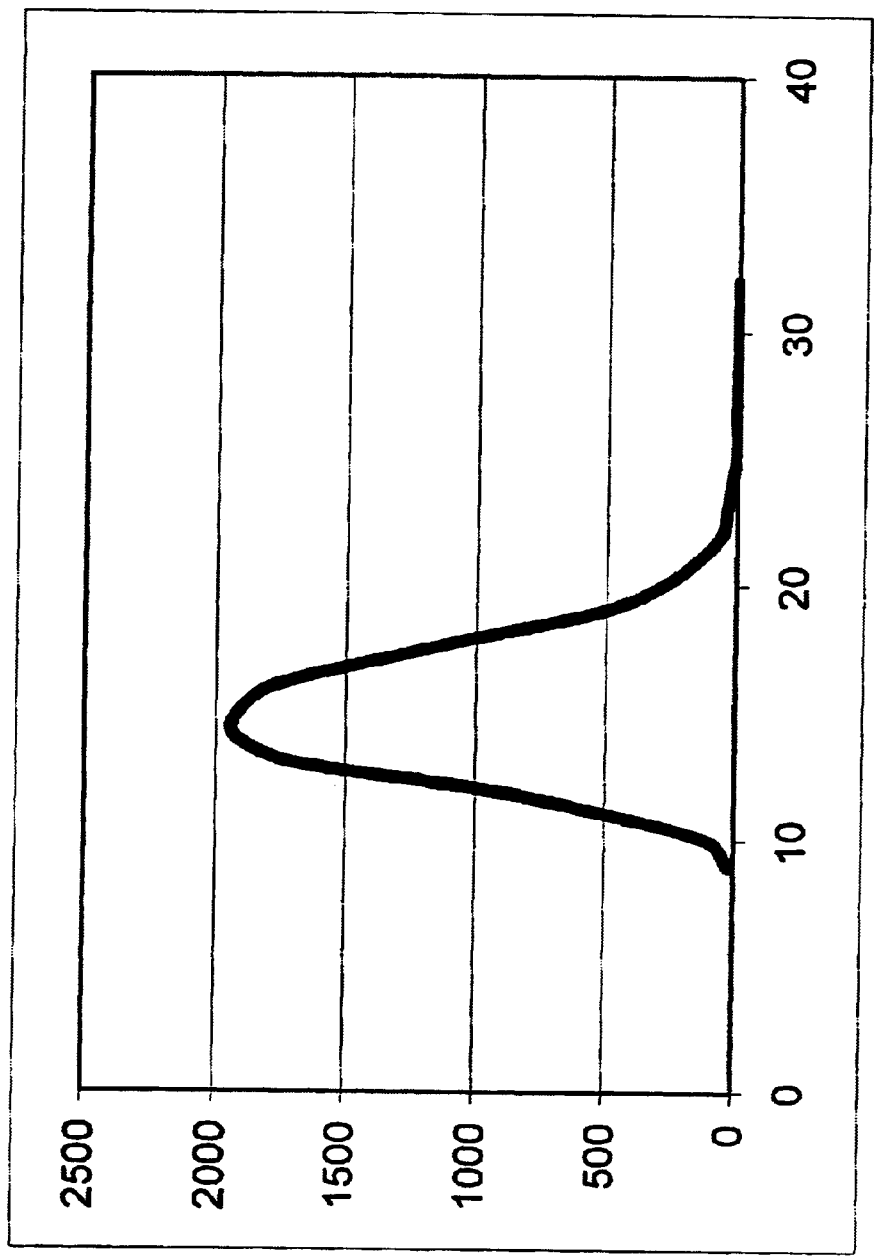
FIG. 11 illustrates a plot with the average distance on the horizontal and number of products with that average distance on the vertical axis in accordance with a preferred embodiment.

FIG. 11 illustrates a plot with the average distance on the horizontal and number of products with that average distance on the vertical axis in accordance with a preferred embodiment. The bell curve shape of the chart is a good indication that our corpus is accurate. The chart shows, however, that there are a few products with an average distance over twenty-five. These products probably have inaccurate keyword sets and should be manually modified.

Figure 12:
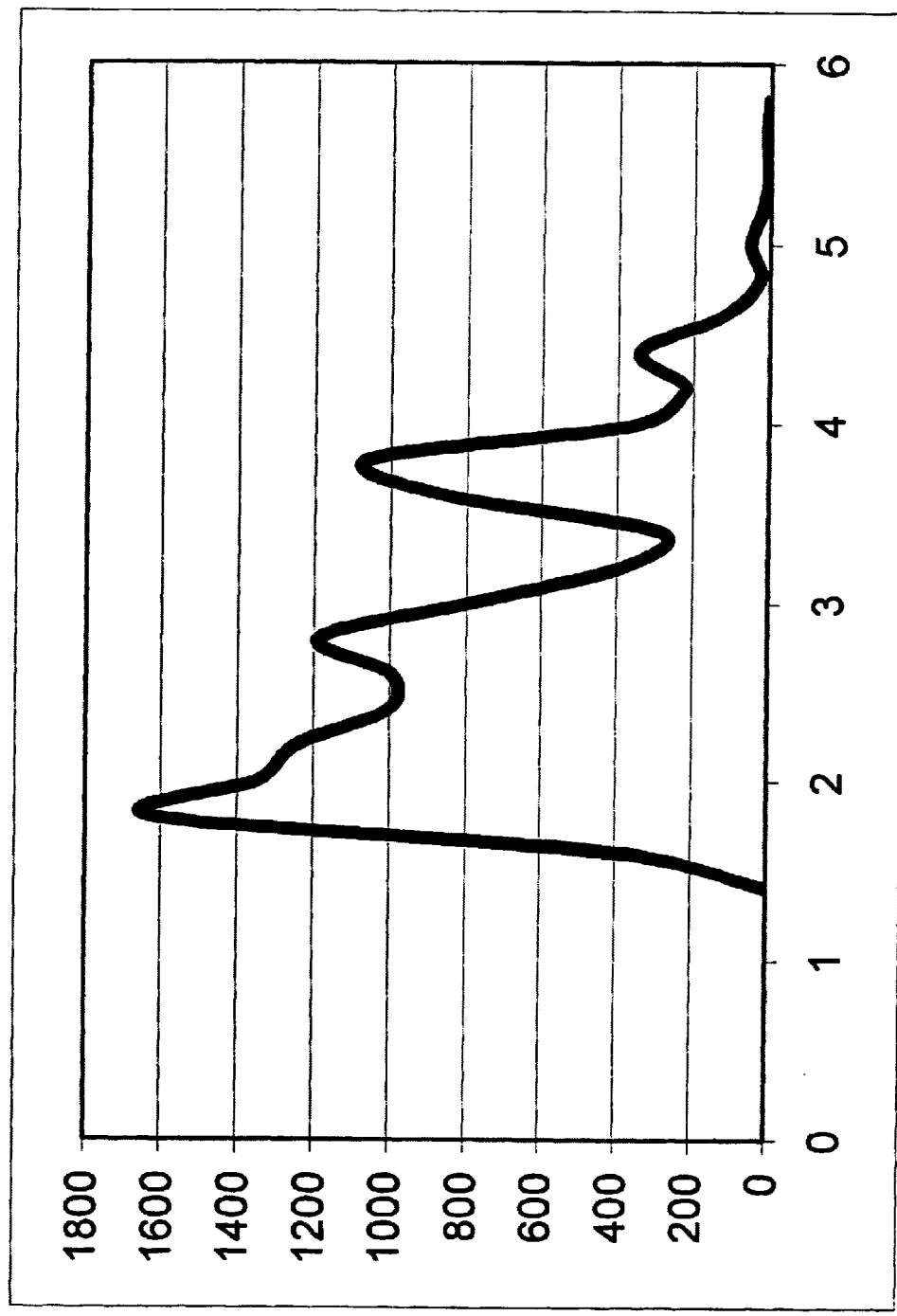
FIG. 12 illustrates a plot similar to FIG. 11 except NDF distance is utilized in accordance with a preferred embodiment.

FIG. 12 illustrates a plot similar to FIG. 11 except NDF distance is utilized in accordance with a preferred embodiment. Again the outlyers at the far right of the chart should probably be examined.

Figure 13:
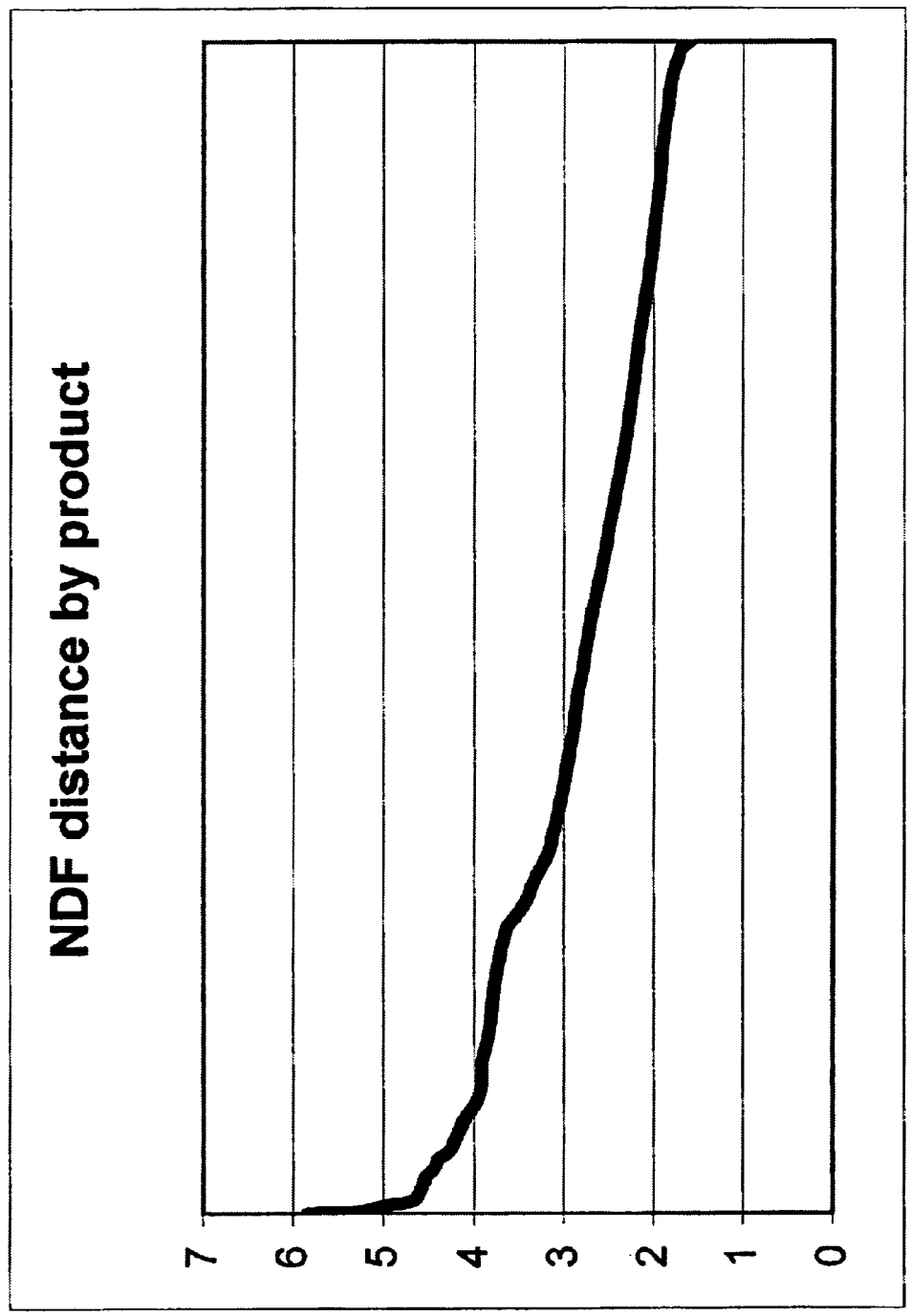
FIG. 13 is a plot with the data is presented by sorting average distance to other products for NDF distance in accordance with a preferred embodiment.

Another way to depict this data is by sorting products by their average distance to other products, and plotting the products in descending order. FIG. 13 is a plot with the data is presented by sorting average distance to other products for NDF distance in accordance with a preferred embodiment. Here again we see a few products with unusually large average distances at the left side of the chart. The rest of the chart, however, is rather uniform.

The most natural way to test a corpus is to see if you can get to where you want to go. Twenty-five products were selected at random and then checked to see if the navigation operations could be used to easily find the products. Most were fairly easy to find once users were familiar with the aquarium navigation operations. A statistical approach to testing the corpus is to see if it can be clustered into sensible categories.

Rep Sets

Earlier we discussed representation sets (a.k.a. rep sets). Rep sets address the problem of what to initially display in the aquarium when we know nothing about the user. An algorithm that finds twenty-two products which represent the twelve thousand product corpus. The logic for this procedure is detailed below in accordance with a preferred embodiment.
1. Sort products by how many other products they are unrelated to. (A product is unrelated to another if their keyword set intersection is less than t, for some threshold t. We use t=1.)
2. Add the first product in the list to the rep set. That is, add the product which is related to the most other products.
3. Iterate over the rest of the list, adding a product to the rep set if it is unrelated to every other product in the rep set. This algorithm is very fast. It found the 22 products in our 12,000 product corpus in about 20 seconds. A more conventional way to find rep sets is to use common clustering algorithms. We tested our corpus with two such algorithms, k-mean and Partitioning Around Medoids (PAM), using a commercial statistics package. The package was not efficient enough to cluster the full 12,000 products, so we randomly selected 300 products (2.5%) to work with. The following chart compares the rep sets generated by our relatedness algorithm (outlined above), PAM and k-mean.

Figure 14:
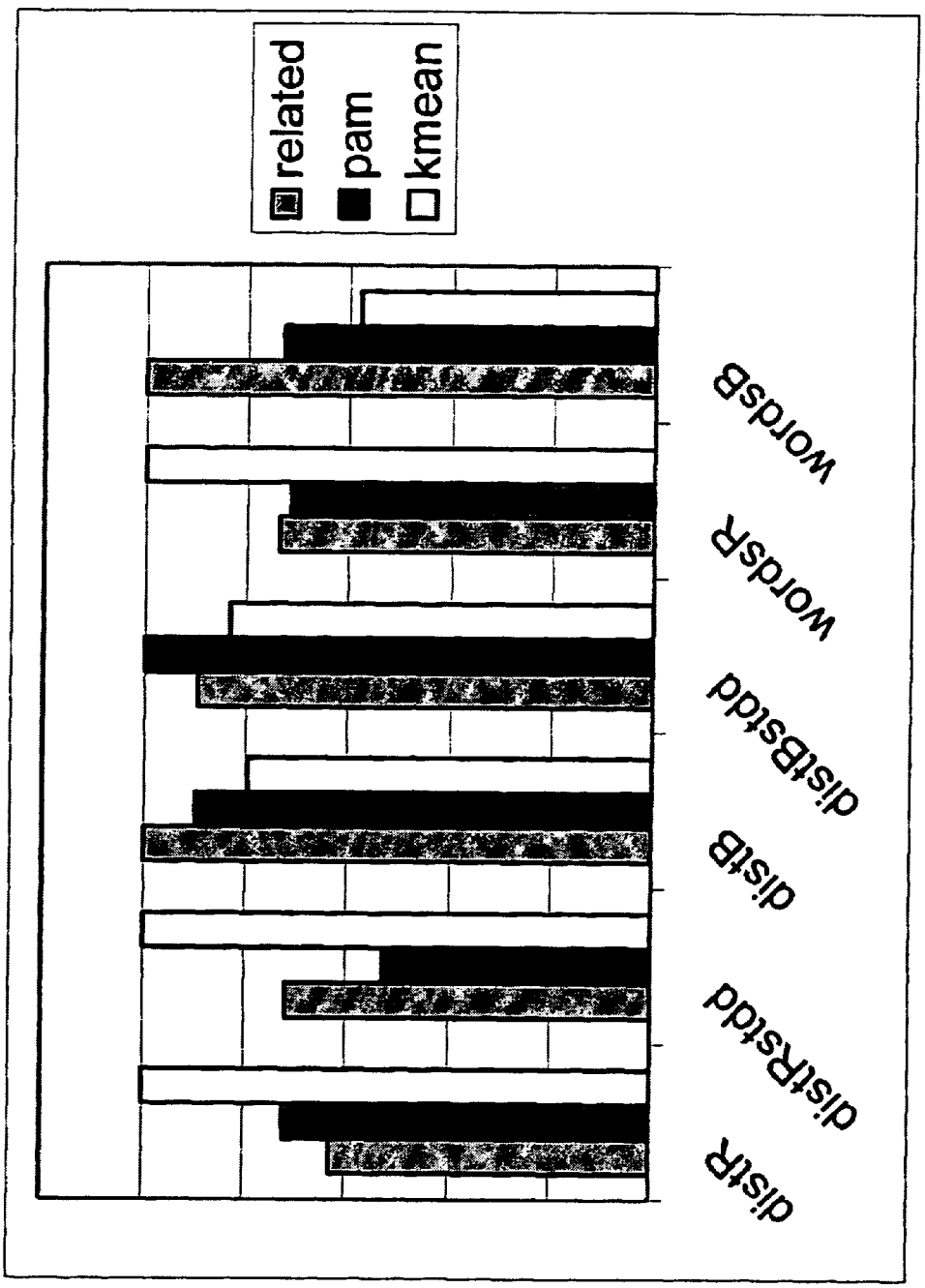
FIG. 14 is a bar chart depicting the categories in accordance with a preferred embodiment.

FIG. 14 is a bar chart depicting the categories in accordance with a preferred embodiment. The categories charted are:
distR: Average distance between members of the rep set, using the NDF distance described earlier. (NDF values are real numbers and thus the R in distR stands for "real.")
distRstdd: The standard deviation of distR.
distB: Average Boolean distance between members of the rep set. (Boolean distance was also described earlier.)
distBstdd: The standard deviation of distB.
wordsR: The sum of the NDF of the keywords used in the rep set. Namely, consider products as sets of keywords.

Figure 15:
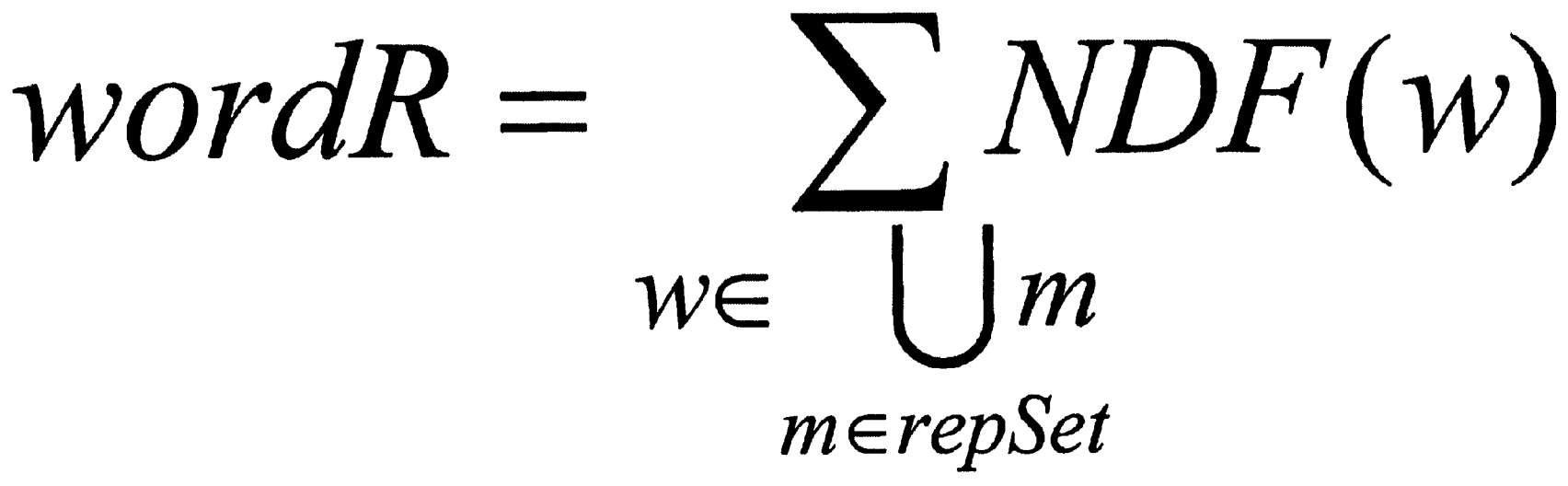

FIG. 15 presents the mathematical representation of the equation in accordance with a preferred embodiment. The union of all members of the rep set is calculated and then the sum of the NDF's is calculated in accordance with a preferred embodiment.

wordsB: The cardinality of the union of members of the rep set. That is, how many keywords are used to describe the rep set.

Ideally the average distance is maximized and its deviation is minimized. Also the results for NDF-based distance are more significant to the problem at hand than Boolean distance. Clearly, words have different abilities to divide a corpus. For example dividing our corpus into products described and not described by "red" gives us a set of 110 products and a set of 11,890 products. However the smaller set contains everything from gas cans to lip stick. That is, this is not a categorization commonly understood by users. On the other hand, dividing the corpus by "health" gives us sets of 1704 and 10296 where most users would recognize the smaller set as a category. Generally speaking, high-NDF words are better discriminators and thus we wish to maximize distR. (Of course, this assumes that very high NDF words, like "a" and "the" do not exist in the corpus.) Overall, k-mean performs the best. Keep in mind that PAM and k-mean were run on a small (2.5%) sample of the corpus. Results would most likely improve if the sample size were increased.

Animator

The two main throughput concerns for the animator are getting photos from disk to system memory, and moving them to display memory in accordance with a preferred embodiment. The speed that they can be moved to system memory is a function of disk speed, bus speed, network speed if the server and client are different machines, and photo size. The prototype stores full bitmap images (.BMP) on a local disk. Although BMP's are on average 6 times larger than their GIF and JPEG counterparts, we found that moving large files is faster than moving small files which then need to be decompressed; 2–10 times faster in fact. If photos are moved across a network, then size will become a bigger concern. Companies like Live Picture and Digital Frontiers have tools which address the problem of moving pictures across a net.

An animator in accordance with a preferred embodiment utilizes Microsoft's DirectDraw API to move photos from system memory to display memory. DirectDraw is a very thin API designed for 2D graphics applications, and supports double buffering of frame buffers. The basic structure of the animator is as follows:

```
while (!done) {
    patch the current position of photos;
    calculate new position of photos;
    draw photos;
    flip frame buffers;
    check for and process commands;
}
```

Figure 16:
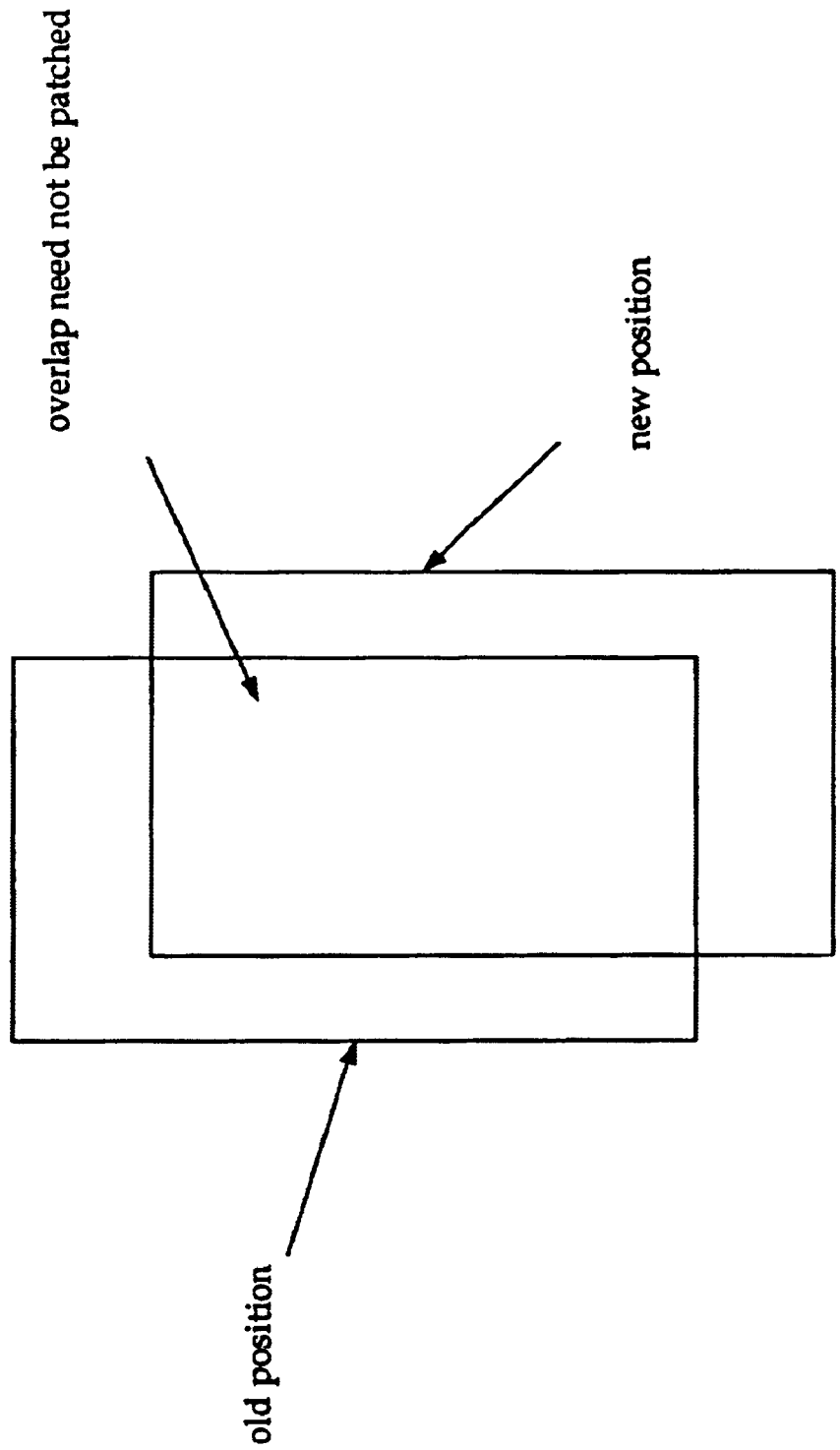
FIG. 16 illustrates a patch process in accordance with a preferred embodiment.

"Patching" is the process of copying a section of a background image on to a frame buffer, to "erase" an image. The prototype animator patches an entire image, rather than just the parts what would be visible when the image is drawn in its new position. Patching only the parts which would be visible might increase performance. FIG. 16 illustrates a patch process in accordance with a preferred embodiment.

Mixer

Figure 17:
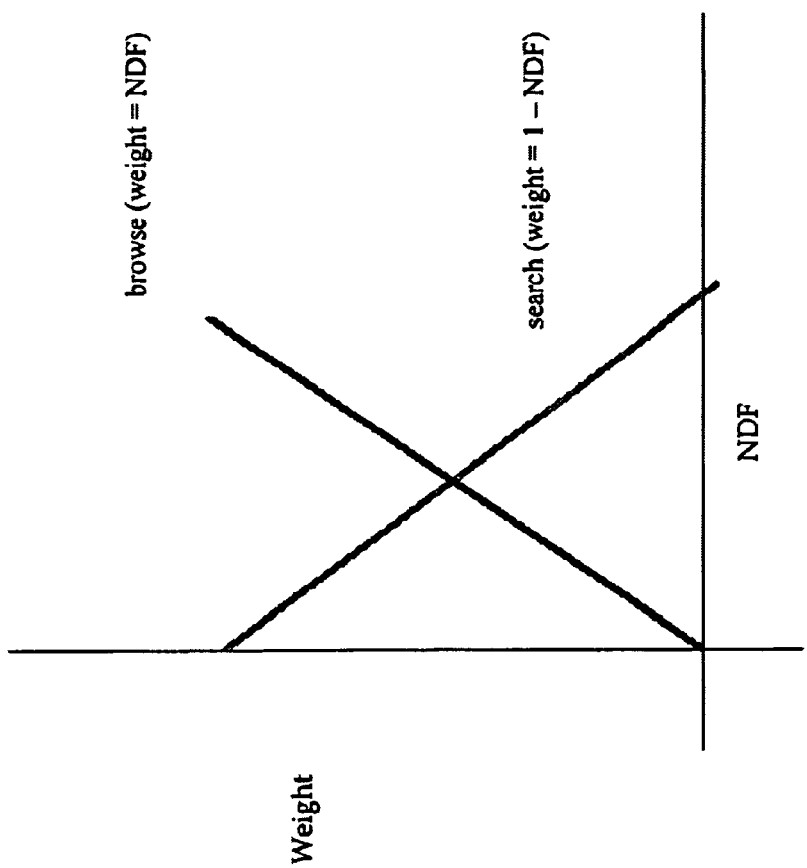
FIG. 17 is a plot of weight versus NDF in accordance with a preferred embodiment.

The prototype implementation of the mixer is based on two observation:

1. When a user is moving rapidly through a corpus, keywords with high NDF are most useful. That is, when a user is quickly moving between product categories (i.e., browsing) then it is the names of the categories rather than the names of individual products which should be given high weight. For example, when browsing "sports" and "cooking" are given a higher weights than "soccer" or "pan." FIG. 17 is a plot of weight versus NDF in accordance with a preferred embodiment.

2. The speed at which a user is "moving" through a corpus is based on the similarity of the items they have recently examined. As illustrated in FIG. 17, when browsing, a keyword's weight is proportional to the keyword's NDF; when searching, it is inversely proportional to NDF (1−NDF). The problem then becomes one of determining to what degree the user is searching or browsing. We use the term "depth" to refer to this degree.

Figure 18:
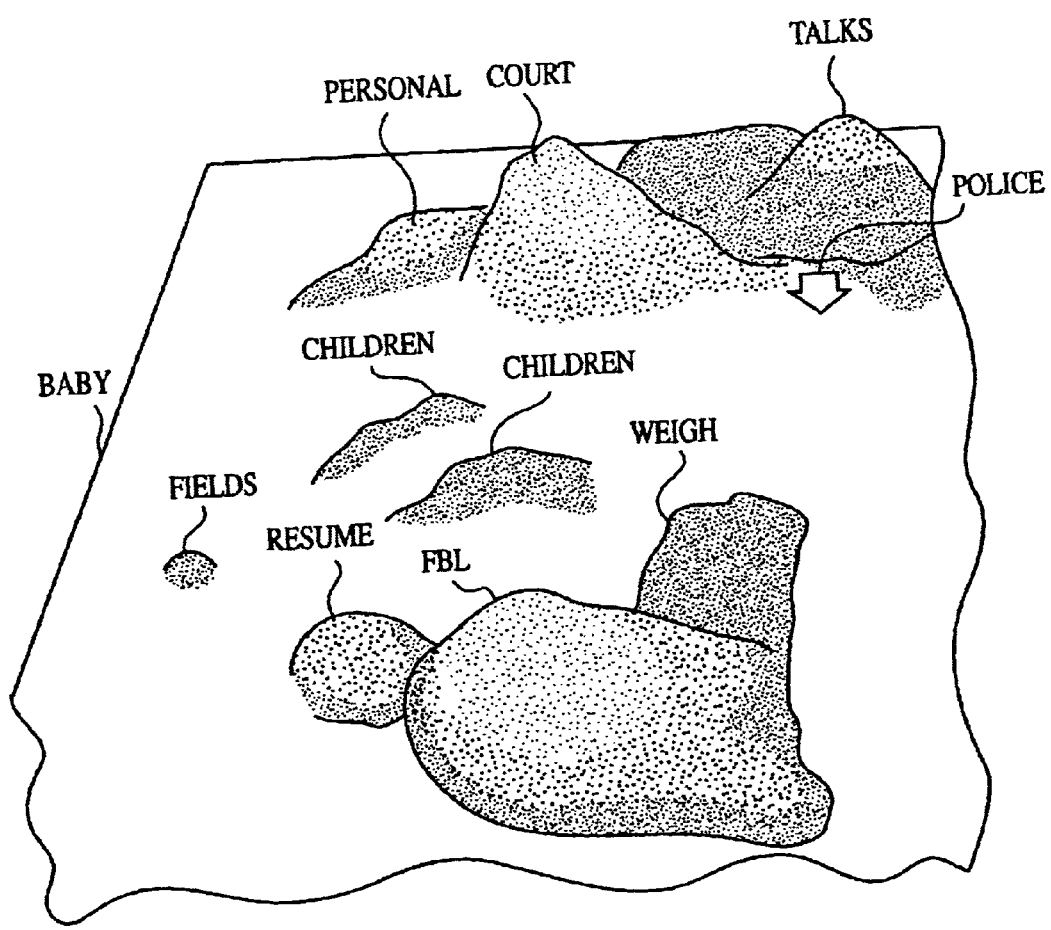
FIG. 18 illustrates a two dimensional rendering of depth in accordance with a preferred embodiment.

Our implementation of depth is derived from thinking about a corpus in a 2.5D landscape metaphor, as illustrated by the figure to the right. Briefly, in this metaphor keywords are arranged on a 2D grid. Keywords that often appear together in documents are placed close to each other so that the distance between keywords is inversely proportional to their "relatedness." Then, terrain or hills are added. The height of a hill is proportional to the number of documents which contain the keyword at the hill's location. Thus common words appear as peaks and infrequent words as valleys. FIG. 18 illustrates a two dimensional rendering of depth in accordance with a preferred embodiment.

We then calculate depth based on three measures:

1. The degree to which the user is moving in a consistent direction.
2. The speed that the user is moving.
3. The degree to which the user is moving toward low frequency (i.e., uncommon) keywords.
4.

Figure 19:
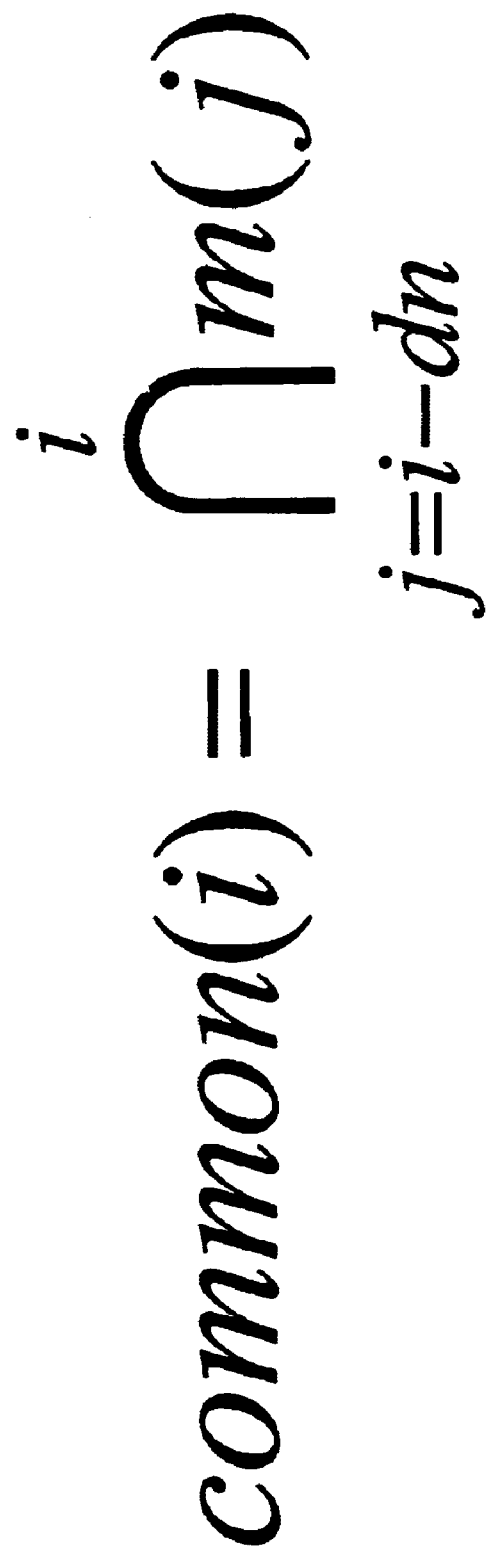
Figure 20:
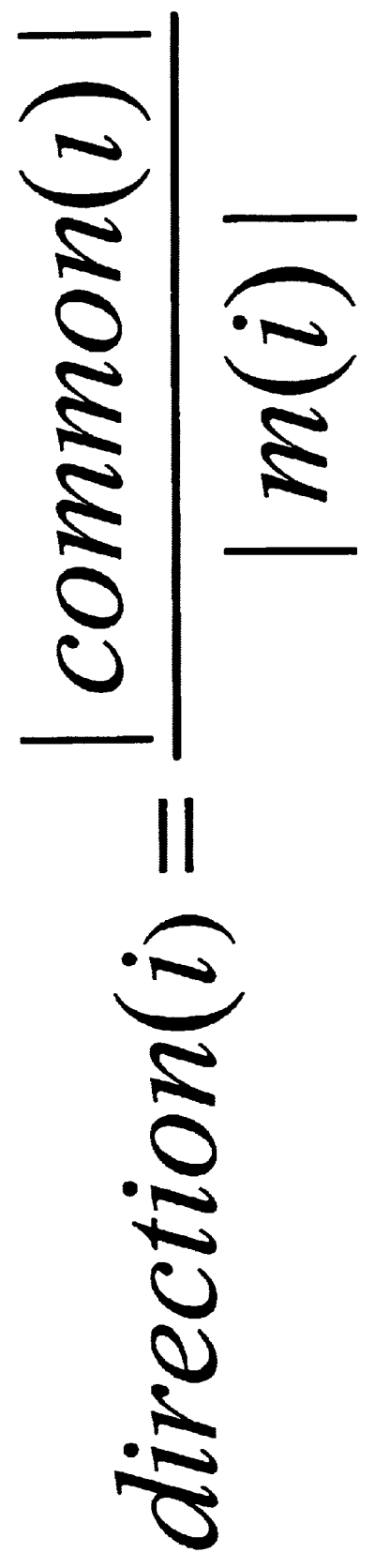

"Moves" are simply the products which the user has selected in "more" operations. A series of moves forms a path, speed, direction, etc. Let m(i) be the keyword set of the $i^{th}$ move and dn be the number of past moves we will examine. Then common(i) is the intersection of the past dn moves: Direction(i) measures the degree to which the user is moving in a consistent direction and is implemented as the cardinality of common(i) over the cardinality of the last move. The divisor is needed to normalize the value in the range [0,1]. FIGS. 19 and 20 illustrate the mathematical formula associated with the calculations of distance and direction in accordance with a preferred embodiment. The speed that a user travels between moves m(j) and m(j−1) is the cardinality of the union of the sets over the cardinality of their intersection. Thus if two consecutive moves share few words, then the user is moving fast. The speed of consecutive steps is summed, and then divided by the number of moves examined. We need depth to be inversely proportional to speed (as speed increases depth decreases), so we calculate inverse speed, or ispeed, of steps. FIG. 21 illustrates the formula for the calculation of speed in accordance with a preferred embodiment.

Descent into low frequency words is measured as the average NIDF (normalized, inverse document frequency) of the words that the past few moves have in common.

And finally, depth is measures as a composite of direction, ispeed, and descent. FIG. 22 illustrates the mathematical formula associated with the calculation of NIDF and depth in accordance with a preferred embodiment.

Descent is the best indicator of depth, and thus weight it at 0.5 (•=0.5) and weight direction and ispeed at 0.25 (•=•=0.25). We have also found that examining only 3 past moves (dn=3) is sufficient. Large values of depth indicate that the user is moving slowly, in a constant direction, among low frequency words; i.e., careful search. Low values of depth indicate that the user is moving rapidly, in many directions, among high frequency words; i.e., haphazard browsing.

A depth of zero indicates the ascending line in the graph shown earlier, while a depth of one indicates the descending line. Thus, as depth varies from zero to one we wish to vary weight from, $$\text{weight}(w)=NDF(w)$$

to, $$\text{weight}(w)=1-NDF(w).$$

The following function accomplishes this:

$$\text{weight}(w)=(-2*\text{depth}+1)*NDF(w)+\text{depth}$$

Given this weight function, the mixer's implementation of the user operation more(p) is as follows:
1. Collect all products related to p and place them in a "pool". (q is related to p if they share a keyword.)
2. Set all weights to zero.
3. Calculate the weights of the keywords of p.
4. Sort the pool in descending order by match(x).

Figure 23:
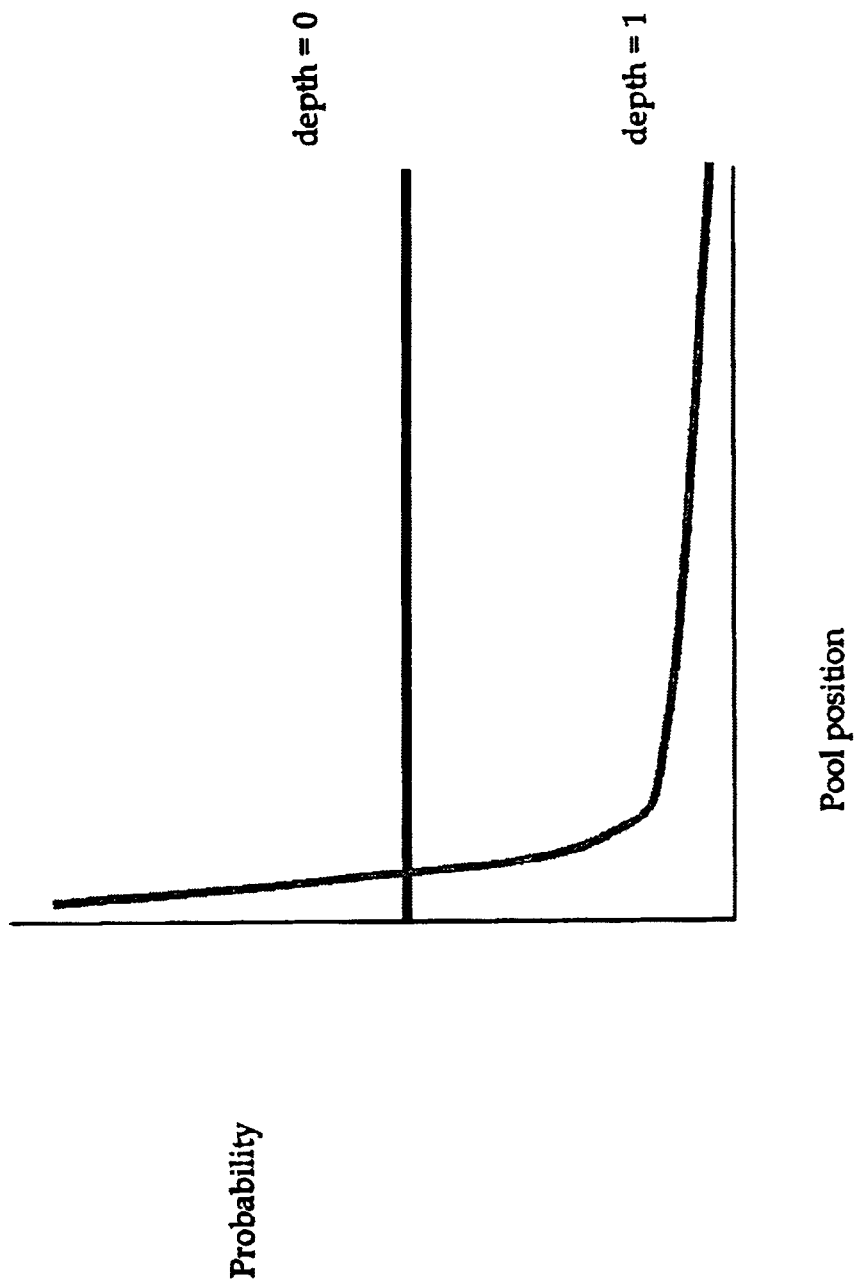
FIG. 23 illustrates a probability plot of the pool position in accordance with a preferred embodiment.

Finally, we sample the pool according to depth. When depth is high, we want the products at the front of the pool, and when depth is low we want a uniform sampling of the pool. FIG. 23 illustrates a probability plot of the pool position in accordance with a preferred embodiment.

For speed's sake, we implement this by calculating a step size, $$\text{step}=1+(1-\text{depth})*(\text{poolLength}/\text{screenSize}-1)$$

where poolLength is the number of products in the pool, and screenSize is the number of products we can fit on the display at once. We then simply grab every step-th product from the pool.

Another approach to sampling the pool is to perform hierarchical clustering and select the medoids of clusters. Whether clustering can be made fast enough for interactive operations is an open question. We have not yet experimented with hierarchical clustering of pools.

Figure 24:
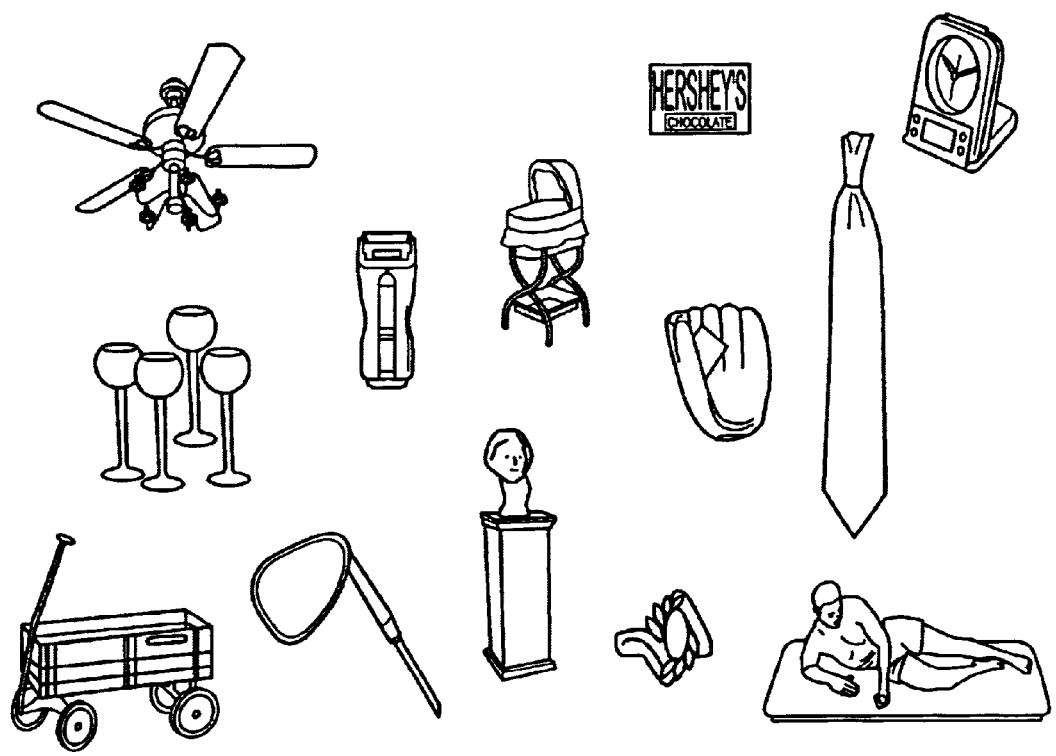
FIG. 24 is a visual display in accordance with a preferred embodiment.

FIG. 24 is a visual display in accordance with a preferred embodiment. A user is presented with an assortment of diverse items that may be of interest. Selection of one or more of the items will allow the user to quickly traverse the database of items and select items of interest to the user.

A novel, visual metaphor for online shopping is disclosed in accordance with a preferred embodiment. The metaphor is very simple to use and affords users a great deal of freedom in selecting the products to be viewed. Its implementation is based on information retrieval techniques which have been shown to scale to millions of users and hundreds of millions of items. While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for display navigation, comprising the steps of:

(a) presenting indicia of a first target category and a second target category on a display, wherein the indicia is associated with at least one keyword and wherein the at least one keyword is assigned a weight;

(b) allowing a user to perform a plurality of user interactions to specify more of the indicia or less of the indicia;

(c) detecting selection of more of the indicia or less of the indicia;

(d) presenting additional indicia to the user on the display in response to the selection of more of the indicia or less of the indicia, the additional indicia representing an additional target category which is similar to a target category of the first and second target categories for which the user selected more of the indicia, or representing an additional target category which is dissimilar to the one target category of the first and second target categories for which the user selected less of the indicia, wherein the additional indicia presented is based on the weight of the at least one keyword; and (e) displaying the additional indicia corresponding to the selected indicia.

2. A method for display navigation as recited in claim 1, including the step of overlapping target category to provide gradual user navigation to a final target category.

3. A method for display navigation as recited in claim 1, including the step of storing the category and indicia in a database.

4. A method for display navigation as recited in claim 1, including the step of characterizing an item based on the words utilized to describe the item.

5. A method for display navigation as recited in claim 1, including the step of representing an item with a graphic representation.

6. A method for display navigation as recited in claim 1, including the step of normalizing words.

7. A method for display navigation as recited in claim 1, including the step of determining items of interest to a user based on the duration of a user's interest.

8. A method for display navigation as recited in claim 1, including the step of utilizing a thesauri to normalize an item's description.

9. A method for display navigation as recited in claim 1, including the step of presenting information in an aquarium motif.

10. An apparatus that creates an information summary, comprising:

(a) a processor;

(b) a memory that stores information under the control of the processor;

(c) logic that retrieves an electronic indicia of a target item, wherein the electronic indicia is associated with at least one keyword and wherein the at least one keyword is assigned a weight;

(d) logic that creates a query based on the electronic media;

(e) logic that allows a user to perform a plurality of user interactions to select the electronic indicia, wherein the user indicates a preference for additional indicia by specifying more of the electronic indicia or less of the electronic indicia;

(f) logic that queries a network of information utilizing the query; and (g) logic that provides the information associated with the target item to a user by presenting additional indicia to the user representing a second target item which is similar to the target item in response to a preference for more of the electronic indicia, or representing a third target item which is dissimilar to the target item in response to a preference for less of the electronic indicia, wherein the additional indicia presented is based on the weight of the at least one keyword.

11. A computer program embodied on a computer-readable medium that creates an information summary, comprising:
(a) a code segment that retrieves an electronic indicia of a target item, wherein the electronic indicia is associated with at least one keyword and wherein the at least one keyword is assigned a weight;
(b) a code segment that creates a query based on the electronic media;
(c) a code segment that allows a user to perform a plurality of user interactions to select the electronic indicia, wherein the user indicates a preference for additional indicia by specifying more of the electronic indicia or less of the electronic indicia;
(d) a code segment that queries a network of information utilizing the query; and
(e) a code segment that provides the information associated with the target item to a user by presenting additional indicia to the user representing a second target item which is similar to the target item in response to a preference for more of the electronic indicia, or representing a third target item which is dissimilar to the target item in response to a preference for less of the electronic indicia, wherein the additional indicia presented is based on the weight of the at least one keyword.

12. A computer program embodied on a computer-readable medium that creates an information summary as recited in claim 11, including logic that parses the electronic indicia based on predefined criteria to create the query.

13. A computer program embodied on a computer-readable medium that creates an information summary as recited in claim 11, including logic responds to a user indicia to buy and utilizes the electronic indicia of the target item with user profile information to electronically purchase the target item.

14. A computer program embodied on a computer-readable medium that creates an information summary as recited in claim 11, including logic that ranks the results based on user relevance.

15. A computer program embodied on a computer-readable medium that creates an information summary as recited in claim 11, including logic that utilizes matching as a filtering device for the information summary.

16. A computer program embodied on a computer-readable medium that creates an information summary as recited in claim 11, including logic that recognizes patterns to enhance the location of pertinent information.

17. A computer program embodied on a computer-readable medium that creates an information summary as recited in claim 11, including logic that queries the Internet to obtain pertinent information.

18. A computer program embodied on a computer-readable medium that creates an information summary as recited in claim 11, including logic that optimizes the query for a particular search engine.

19. A computer program embodied on a computer-readable medium that creates an information summary as recited in claim 11, including logic that responds to updates of the information to obtain additional information.

20. The apparatus of claim 10, wherein the electronic indicia is presented in an aquarium motif on a display.

21. The apparatus of claim 10, wherein logic that creates a query parses the electronic indicia based on predefined criteria to create the query.

22. The apparatus of claim 10, further comprising logic that responds to a user indicia to buy and utilizes the electronic indicia of the target item with user profile information to electronically purchase the target item.

23. The apparatus of claim 10, further comprising logic that utilizes matching as a filtering device for the information.

24. The apparatus of claim 10, further comprising logic that recognizes patterns to enhance the location of pertinent information.

25. A method of providing customized content over a network, comprising:
presenting a plurality of indicia representing diverse content from a plurality of target categories on a display, wherein the plurality of indicia is dynamically presented by changing in response to a user's action or lack thereof, wherein the plurality of indicia is associated with at least one keyword and wherein the at least one keyword is assigned a weight;
allowing a user to perform a plurality of user interactions to select at least one of the plurality of indicia, wherein a user can indicate a preference for or against the at least one of the plurality of indicia;
formulating a determination of the user's preferred content from the plurality of user interactions and information in a user profile;
presenting additional indicia relating to the user's preferred content corresponding to the plurality of user interactions wherein the additional indicia represent a target category similar to the plurality of indicia in response to a preference for the at least one of the plurality of indicia, and wherein the additional indicia represent a target category dissimilar to the plurality of indicia in response to a preference against the at least one of the plurality of indicia, wherein the additional indicia presented is based on the weight of the at least one keyword; and
excluding further indicia unrelated to the user's preferred content.

26. The method of claim 25, wherein the plurality of user interactions includes commands from the user expressing a desire to view more content related to a target category or less content related to a target category.

27. The method of claim 26, wherein the commands are voice commands.

28. The method of claim 26, wherein the commands are keyboard commands.

29. The method of claim 26, wherein the commands are expressed by touching the display.

30. The method of claim 25, wherein the target categories are overlapped to provide gradual user navigation to a final target category.

31. The method of claim 25, wherein the target categories and indicia are stored in a database.

32. The method of claim 25, wherein indicia are characterized based on the words utilized to describe the item.

33. The method of claim 25, wherein indicia of interest to a user are determined based on the duration of a user's interest.

34. The method of claim 25, wherein information is presented in an aquarium motif.

* * * * *